US010962989B2

(12) United States Patent
Murakoshi et al.

(10) Patent No.: US 10,962,989 B2
(45) Date of Patent: *Mar. 30, 2021

(54) ATTITUDE CONTROL DEVICE, FLYING OBJECT, ATTITUDE CONTROL METHOD, AND PROGRAM

(71) Applicant: Sony Corporation, Tokyo (JP)

(72) Inventors: Sho Murakoshi, Tokyo (JP); Hidetoshi Kabasawa, Kanagawa (JP); Tomohiro Matsumoto, Kanagawa (JP); Masahiro Segami, Kanagawa (JP); Kosei Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/479,148

(22) PCT Filed: Jan. 9, 2018

(86) PCT No.: PCT/JP2018/000153
§ 371 (c)(1),
(2) Date: Jul. 18, 2019

(87) PCT Pub. No.: WO2018/135332
PCT Pub. Date: Jul. 26, 2018

(65) Prior Publication Data
US 2019/0391598 A1 Dec. 26, 2019

(30) Foreign Application Priority Data

Jan. 18, 2017 (JP) .............................. JP2017-006471

(51) Int. Cl.
*G05D 1/00* (2006.01)
*G05D 1/08* (2006.01)
(Continued)

(52) U.S. Cl.
CPC ............. *G05D 1/085* (2013.01); *B64C 27/08* (2013.01); *B64C 27/20* (2013.01); *B64C 39/024* (2013.01);
(Continued)

(58) Field of Classification Search
USPC ........................................................ 396/428
See application file for complete search history.

(56) References Cited

U.S. PATENT DOCUMENTS 3,979,089 A * 9/1976 Miller .................... B64D 25/10
244/122 AD
8,459,094 B2 * 6/2013 Yanni ..................... G01P 21/00
73/1.38
(Continued)

FOREIGN PATENT DOCUMENTS

JP 2007-232662 A 9/2007
JP 2008-190931 A 8/2008
(Continued)

OTHER PUBLICATIONS

International Search Report and Written Opinion issued in connection with International Patent Application No. PCT/JP2018/000153, dated Apr. 3, 2018. (11 pages).

*Primary Examiner* — Clayton E. LaBalle
*Assistant Examiner* — Warren K Fenwick
(74) *Attorney, Agent, or Firm* — K&L Gates LLP

(57) ABSTRACT

An attitude control device is provided and includes a control unit that determines a gravity direction in a flying object on a basis of static acceleration components computed on a basis of a first acceleration detection signal obtained by detecting dynamic acceleration components acting on the flying object and a second acceleration detection signal obtained by detecting the dynamic acceleration components and the static acceleration components acting on the flying (Continued)

object, and controls an attitude of the flying object on a basis of the gravity direction.

16 Claims, 14 Drawing Sheets

(51) Int. Cl.
*B64C 27/08* (2006.01)
*B64C 27/20* (2006.01)
*B64C 39/02* (2006.01)

(52) U.S. Cl.
CPC ......... *G05D 1/0066* (2013.01); *G05D 1/0858* (2013.01); *B64C 2201/027* (2013.01)

(56) References Cited

U.S. PATENT DOCUMENTS

| | | | |
|---|---|---|---|
| 9,994,228 B2* | 6/2018 | Krueger | A61B 3/145 |
| 2006/0144994 A1 | 7/2006 | Spirov et al. | |
| 2008/0289417 A1* | 11/2008 | Okada | G01P 15/0922 73/504.03 |
| 2016/0065984 A1* | 3/2016 | Nejat | G06F 16/78 348/231.3 |
| 2020/0041877 A1* | 2/2020 | Murakoshi | G01P 15/18 |

FOREIGN PATENT DOCUMENTS

| | | |
|---|---|---|
| JP | 2011-227017 A | 11/2011 |
| JP | 2016-135625 A | 7/2016 |
| JP | 2016-222031 A | 12/2016 |

* cited by examiner

ATTITUDE CONTROL DEVICE, FLYING OBJECT, ATTITUDE CONTROL METHOD, AND PROGRAM

TECHNICAL FIELD

The present technology relates to a technology for controlling an attitude of a flying object such as a drone.

BACKGROUND ART

In recent years, a device referred to as a drone, which is a type of unmanned airplane, has become widely known (for example, see Patent Literature 1 below). For example, this drone is used in various fields such as aerial photography and transportation.

CITATION LIST

Patent Literature

Patent Literature 1: Japanese Patent Application Laid-open No. 2016-222031

DISCLOSURE OF INVENTION

Technical Problem

In a flying object such as a drone, when an attitude is lost during flight, there is a risk of crashing. Thus, it is important to accurately control the attitude of the flying object.

In view of the above circumstances, it is an object of the present technology to provide a technology capable of accurately controlling the attitude of the flying object.

Solution to Problem

To achieve the above-mentioned object, an attitude control device according to the technology includes a control unit. The control unit determines a gravity direction in a flying object on the basis of static acceleration components computed on the basis of a first acceleration detection signal obtained by detecting dynamic acceleration components acting on the flying object and a second acceleration detection signal obtained by detecting the dynamic acceleration components and the static acceleration components acting on the flying object, and controls an attitude of the flying object on the basis of the gravity direction.

In this attitude control device, the static acceleration components are computed from two signals corresponding to the first acceleration detection signal obtained by detecting the dynamic acceleration components acting on the flying object and the second acceleration detection signal obtained by detecting the dynamic acceleration components and the static acceleration components acting on the flying object. For this reason, it is possible to accurately compute the static acceleration components that can be regarded as gravitational acceleration components. In this way, it is possible to accurately determine the gravity direction of the flying object. As a result, it is possible to accurately control the attitude of the flying object.

In the attitude control device, the control unit may correct the static acceleration components on the basis of correction information for correcting the static acceleration components, and determine the gravity direction on the basis of the corrected static acceleration components.

In this way, it is possible to more accurately determine the gravity direction of the flying object, and to more accurately control the attitude of the flying object.

In the attitude control device, the control unit may correct the static acceleration components on the basis of the correction information for correcting the static acceleration components by using the dynamic acceleration components.

In this way, it is possible to more accurately determine the gravity direction of the flying object, and to more accurately control the attitude of the flying object.

In the attitude control device, the control unit may correct the static acceleration components on the basis of the correction information for correcting the static acceleration components by using angular velocity components acting on the flying object.

In this way, it is possible to more accurately determine the gravity direction of the flying object, and to more accurately control the attitude of the flying object.

In the attitude control device, the control unit may generate the correction information in a state in which the flying object is placed at a certain position.

In this way, it is possible to obtain the correction information by performing calibration in a state in which the flying object is at rest.

In the attitude control device, the control unit may generate the correction information in a state in which the flying object is in air.

In this way, it is possible to obtain the correction information by performing calibration in a state in which the flying object is in air.

The attitude control device may further include an acceleration calculation unit. The acceleration calculation unit computes the static acceleration components on the basis of the first acceleration detection signal having an alternating current (AC) waveform according to the dynamic acceleration components and the second acceleration detection signal having an output waveform in which an AC component according to the dynamic acceleration components is superimposed on a direct current (DC) component according to the static acceleration components.

In the attitude control device, the acceleration calculation unit may include a calculation circuit that computes the static acceleration components on the basis of a difference signal between the first acceleration detection signal and the second acceleration detection signal.

In this way, it is possible to accurately compute the static acceleration components from the first acceleration detection signal and the second acceleration detection signal.

In the attitude control device, the acceleration calculation unit may further include a gain adjustment circuit that adjusts gain of each signal so that the first acceleration detection signal and the second acceleration detection signal have a same level.

In this way, it is possible to more accurately compute the static acceleration components from the first acceleration detection signal and the second acceleration detection signal.

In the attitude control device, the acceleration calculation unit may further include a correction circuit that computes a correction coefficient on the basis of the difference signal and corrects either one of the first acceleration detection signal and the second acceleration detection signal using the correction coefficient.

In this way, it is possible to more accurately compute the static acceleration components from the first acceleration detection signal and the second acceleration detection signal.

The attitude control device may further include a detector. The detector includes a movable portion movable in response to acceleration acting on the flying object, a piezoelectric first acceleration detector provided on the movable portion to output the first acceleration detection signal, and a non-piezoelectric second acceleration detector provided on the movable portion to output the second acceleration detection signal.

In this attitude control device, it is possible to accurately compute the static acceleration components from these outputs using a difference in detection scheme (piezoelectric type and non-piezoelectric type) between the first acceleration detector and the second acceleration detector.

In the attitude control device, the second acceleration detector may include a piezoresistive acceleration detection element. Alternatively, the second acceleration detector may include an electrostatic capacitive acceleration detection element.

A flying object according to the present technology includes a detector and a control unit. The detector outputs a first acceleration detection signal obtained by detecting dynamic acceleration components acting on the flying object and a second acceleration detection signal obtained by detecting the dynamic acceleration components and static acceleration components acting on the flying object. The control unit determines a gravity direction in the flying object on the basis of the static acceleration components computed on the basis of the first acceleration detection signal and the second acceleration detection signal, and controls an attitude of the flying object on the basis of the gravity direction.

An attitude control method according to the present technology includes determining a gravity direction in a flying object on the basis of static acceleration components computed on the basis of a first acceleration detection signal obtained by detecting dynamic acceleration components acting on the flying object and a second acceleration detection signal obtained by detecting the dynamic acceleration components and the static acceleration components acting on the flying object, and controlling an attitude of the flying object on the basis of the gravity direction.

A program according to the present technology causes a computer to execute a step of determining a gravity direction in a flying object on the basis of static acceleration components computed on the basis of a first acceleration detection signal obtained by detecting dynamic acceleration components acting on the flying object and a second acceleration detection signal obtained by detecting the dynamic acceleration components and the static acceleration components acting on the flying object, and a step of controlling an attitude of the flying object on the basis of the gravity direction.

Advantageous Effects of Invention

As described above, according to the present technology, it is possible to provide a technology capable of accurately controlling an attitude of a flying object.

MODE(S) FOR CARRYING OUT THE INVENTION

Hereinafter, embodiments according to the present technology will be described with reference to drawings.

First Embodiment

Figure 1:
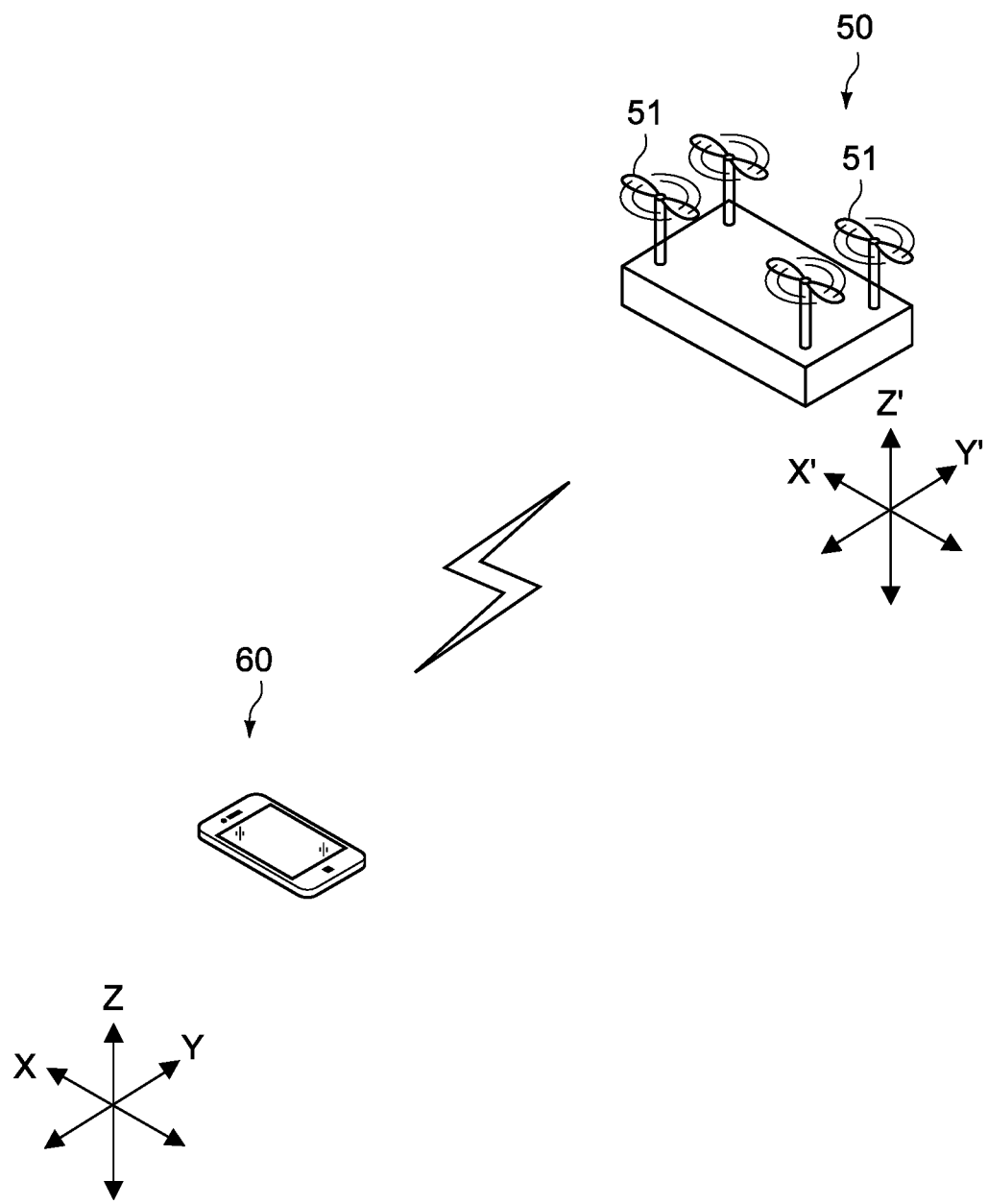
FIG. 1 is a diagram illustrating an appearance when a drone is operated by a remote controller.

<Overall Configuration of System and Configuration of Each Part>
[External Appearance Configuration of System]
FIG. 1 is a diagram illustrating an appearance when a drone 50 is operated by a remote controller 60.
The drone 50 (flying object: attitude control device) is an unmanned airplane which is flyable without a person. The drone 50 is used, for example, in various fields such as aerial photography, transportation, agriculture, security, disaster investigation, and racing.
It should be noted that in description of this specification, a coordinate system based on the earth is referred to as a global coordinate system, and a coordinate system based on the drone 50 is referred to as a local coordinate system. In addition, in the global coordinate system, three orthogonal axes are taken as an X-axis, a Y-axis and a Z-axis. Further, in the local coordinate system, three orthogonal axes are taken as an X'-axis, a Y'-axis and a Z'-axis.

A Z-axis direction in the global coordinate system is the gravity direction, and X-axis and Y-axis directions are arbitrary directions in a horizontal direction. In addition, a Z'-axis direction in the local coordinate system is a vertical direction with respect to the drone 50, and X'-axis and Y'-axis directions are arbitrary directions in the horizontal direction with respect to the drone 50. It should be noted that an attitude of the drone 50 in a case in which the Z-axis direction in the global coordinate system and the Z'-axis direction in the local coordinate system coincide with each other is referred to as a basic attitude.

As illustrated in FIG. 1, the drone 50 includes a propeller 51 (also referred to as a rotor) that generates a lift necessary for flight of the drone 50. In general, the drone 50 is divided into various types of drone 50 in accordance with a type of propeller 51, the number of propellers 51, a shape of an airframe, etc. However, attitude control according to the present technology may be used for any type of drone 50. That is, the type of the propeller 51, the number of propellers 51, and the shape of the airframe in the drone 50 are not particularly limited.

As a type of the propeller 51, for example, a multicopter type, a double inversion type, etc. is used. The multicopter type is a type in which a plurality of propellers 51 is disposed on the same plane (X'Y' plane), and each of the plurality of propellers 51 rotates in an opposite direction to that of another adjacent propeller 51. The double inversion type is a type in which two propellers 51 are coaxially disposed, and the two propellers 51 rotate in mutually opposite directions.

The number of propellers 51 is set to, for example, four, six, eight, etc., in the case of the multicopter type, and is set to, for example, one set, two sets, etc., by setting two propellers to one set in the case of the double inversion type. It should be noted that the multicopter type drone 50 is referred to as a quadcopter (four), a hexacopter (six), an octocopter (eight), etc. in accordance with the number of propellers 51. In an example illustrated in FIG. 1, the quadcopter is illustrated as an example of the drone 50.

The shape of the airframe corresponds to, for example, a rectangular parallelepiped, a sphere, an airplane (fixed wing), a helicopter, an airship, a balloon, etc.

It should be noted that a rotation axis of the double inversion type propeller 51 may be disposed perpendicular to an axis extending in the X'-axis direction, and the rotation axis of the double inversion type propeller 51 may rotate around the X'-axis about the axis.

In this case, a mode in which the rotation axis of the double inversion type propeller 51 is oriented in the Z'-axis direction and the propeller 51 rotates and a mode in which the rotation axis of the double inversion type propeller 51 is oriented in the Y'-axis direction and the propeller 51 rotates are switched. In this case, the shape of the airframe corresponds to, for example, an airplane (fixed wing). It should be noted that hereinafter, this type of drone 50 will be referred to as a flight mode switching type drone 50.

The remote controller 60 is, for example, a smartphone, a tablet PC, a portable game machine, a wearable device (a wristband type, a neck type, a head mount type, etc.), etc. In the example illustrated in FIG. 1, the smartphone is illustrated as an example of the remote controller 60.

It should be noted that the remote controller 60 may correspond to, for example, a drone-dedicated device having two sticks for operating the drone 50. Alternatively, the remote controller 60 may correspond to a remote controller 60 having a type in which a dedicated device having two sticks, a smartphone, a tablet PC, etc. can be connected to each other.

[Functional Block Configuration]

Figure 2:
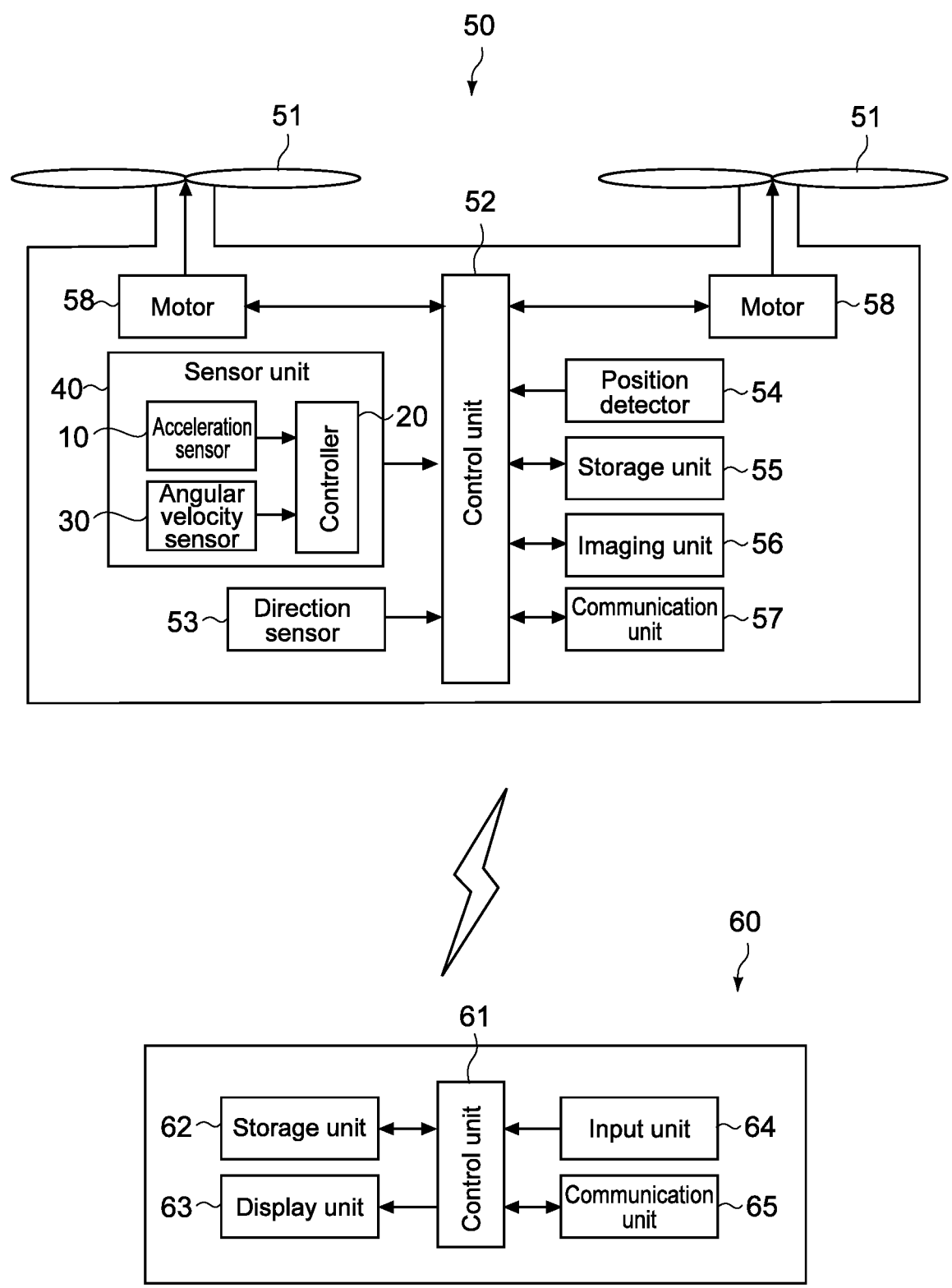
FIG. 2 is a block diagram illustrating a configuration of the drone and the remote controller.

FIG. 2 is a block diagram illustrating a configuration of the drone 50 and the remote controller 60.

[Configuration of Drone 50]

As illustrated in FIG. 2, the drone 50 includes a control unit 52, a sensor unit 40, a direction sensor 53, a position detector 54, a storage unit 55, an imaging unit 56, a communication unit 57, and a motor 58.

The sensor unit 40 has an acceleration sensor 10, an angular velocity sensor 30, and a controller 20. The acceleration sensor 10 detects acceleration in directions of three axes (X'Y'Z'-axes) received by the drone 50 in the local coordinate system.

The angular velocity sensor 30 is, for example, a gyro sensor (vibration type, rotation top type, etc.), and detects an angular velocity around three axes (X'Y'Z'-axes) of the drone 50 in the local coordinate system.

The controller 20 processes an output from the acceleration sensor 10 and the angular velocity sensor 30. In the present embodiment, the controller 20 is configured to be able to accurately separate static acceleration components (gravitational acceleration components) based on gravity and dynamic acceleration components (motion acceleration components) based on motion of the drone 50 from acceleration received by the drone 50, and output the separated components to the control unit 52. It should be noted that a configuration of the sensor unit 40 will be described in detail later.

The direction sensor 53 is, for example, a magnetic sensor, and detects magnetism in three axial directions of the drone 50 in the local coordinate system.

The position detector 54 is, for example, a global positioning system (GPS) detector, receives a signal from a GPS satellite by an antenna, and detects a latitude, a longitude, and an altitude at a current position of the drone 50.

The sensor unit 40 (the acceleration sensor 10 and the angular velocity sensor 30), the direction sensor 53, and the position detector 54 are disposed at a barycentric position in the drone 50, and detect the acceleration, the angular velocity, the direction, the position, etc. in the drone 50 at the barycentric position.

The control unit 52 is configured by a central processing unit (CPU), etc. The control unit 52 executes various calculations on the basis of various programs stored in the storage unit 55, and controls the respective units of the drone 50 in an integrated manner.

In particular, in the present embodiment, the control unit 52 determines the attitude of the drone 50 and controls the attitude of the drone 50. Even though details will be described below, in the present embodiment, the static acceleration components, that is, the gravitational acceleration components in an acceleration detection signal detected by the acceleration sensor 10 can be accurately computed by the sensor unit 40. For this reason, in the present embodiment, the control unit 52 can accurately determine a gravity direction of the drone 50, and can accurately control the attitude of the drone 50. It should be noted that processing of the control unit 52 will be described in detail later.

The storage unit 55 includes a non-volatile memory storing various programs necessary for processing of the control unit 52 and various data, and a volatile memory used as a work area of the control unit 52.

The imaging unit 56 includes an optical system of an objective lens, an imaging lens, etc. and an imaging element of a complementary metal oxide semiconductor (CMOS) sensor or a charge coupled device (CCD) sensor that converts light taken through the optical system into an electrical signal. The communication unit 57 is configured to be able to communicate with the remote controller 60 wirelessly (or may be by wire).

Each of motors 58 is independently provided for each of the propellers 51 to generate a driving force for rotating the propeller 51. The motor 58 can move the drone 50 vertically (in the Z-axis direction) or horizontally (in a direction in the XY plane), or turn the drone 50 by adjusting the amount of rotation of the propeller 51 in accordance with a signal from the control unit 52.

[Configuration of Remote Controller 60]

The remote controller 60 includes a control unit 61, a storage unit 62, a display unit 63, an input unit 64, and a communication unit 65.

The control unit 52 is configured by a CPU, etc., executes various calculations on the basis of various programs stored in the storage unit 62, and comprehensively controls the respective units of the remote controller 60.

The storage unit 62 includes a non-volatile memory storing various programs necessary for processing of the control unit 61 and various data, and a volatile memory used as a work area of the control unit 61.

The display unit 63 is configured by, for example, a liquid crystal display, an EL display (EL: Electro Luminescence), etc. Under the control of the control unit 61, the display unit 63 displays an image for operating the drone 50 (for example, an icon schematically representing two sticks), an image captured by the drone 50, etc.

The input unit 64 inputs an instruction from a user, and outputs a signal corresponding to the instruction from the user to the control unit 61. The input unit 64 is, for example, a touch sensor provided on the display unit 63.

The communication unit 65 is configured to be able to communicate with the drone 50 wirelessly (or may be by wire). In addition, the communication unit 65 is configured to be able to communicate with a server device on the network.

[Configuration of Sensor Unit 40]

Figure 3:
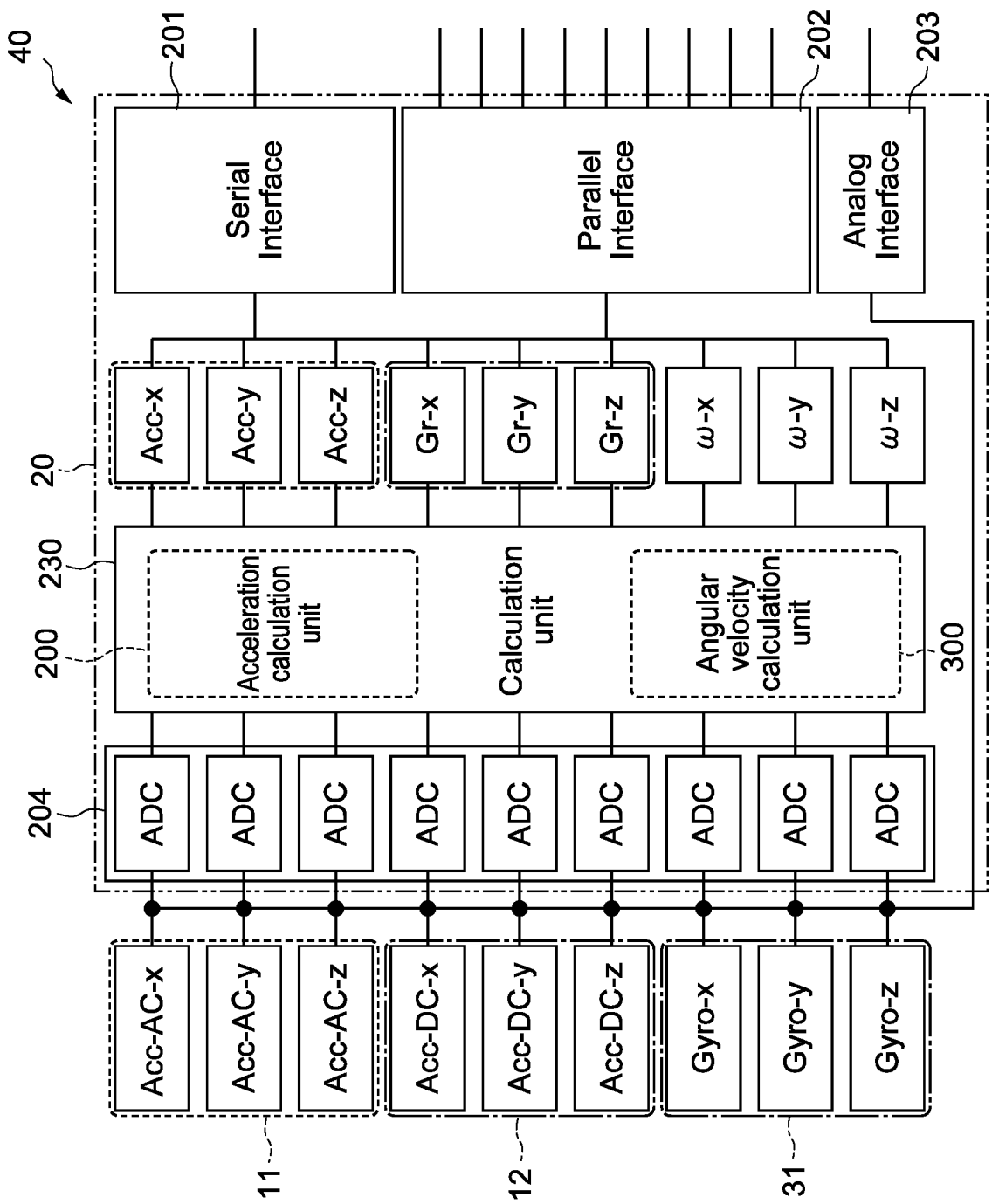
FIG. 3 is a block diagram illustrating a configuration of a sensor unit.

Next, a configuration of the sensor unit 40 according to the present embodiment will be described in detail. FIG. 3 is a block diagram illustrating the configuration of the sensor unit 40.

The sensor unit 40 in the present embodiment is configured to be able to compute each of dynamic acceleration components and static acceleration components from acceleration detected by the acceleration sensor 10.

Here, the dynamic acceleration components typically means AC components of an acceleration signal detected by the acceleration sensor 10, and typically corresponds to motion acceleration (translational acceleration, centrifugal acceleration, tangent acceleration, etc.) received by the drone 50. On the other hand, the static acceleration components means DC components of the acceleration signal detected by the acceleration sensor 10, and typically corresponds to gravitational acceleration or acceleration estimated to be gravitational acceleration.

As illustrated in FIG. 3, the acceleration sensor 10 includes two types of acceleration detectors 11 and 12 (detectors: first acceleration detector 11 and second acceleration detector 12), each of which detects information related to acceleration in three axial directions (local coordinate system). The angular velocity sensor 30 has an angular velocity detector 31.

The first acceleration detector 11 is a piezoelectric acceleration sensor 10, and outputs each of a signal (Acc-AC-x) including information related to acceleration in the X'-axis direction, a signal (Acc-AC-y) including information related to acceleration in the Y'-axis direction, and a signal (Acc-AC-z) including information related to acceleration in the Z'-axis direction. Each of the signals output from the first acceleration detector 11 has an AC waveform according to acceleration in each axis.

On the other hand, the second acceleration detector 12 is a non-piezoelectric acceleration sensor 10, and outputs each of a signal (Acc-DC-x) including information related to acceleration in the X'-axis direction, a signal (Acc-DC-y) including information related to acceleration in the Y'-axis direction, and a signal (Acc-DC-z) including information related to acceleration in the Z'-axis direction. Each of the signals output from the second acceleration detector 12 has an output waveform in which an AC component corresponding to acceleration in each axis is superimposed on a DC component.

The angular velocity detector 31 outputs each of an angular velocity detection signal (Gyro-x) around the X'-axis, an angular velocity detection signal (Gyro-y) around the Y'-axis, and an angular velocity detection signal (Gyro-z) around the Z'-axis.

The controller 20 includes a converter 204, a calculation unit 230, a serial interface 201, a parallel interface 202, and an analog interface 203.

The converter 204 performs Analog-Digital (AD) conversion on the signals detected by the acceleration sensor 10 and the angular velocity sensor 30, and outputs the converted signals to the calculation unit 230.

The calculation unit 230 includes an acceleration calculation unit 200 and an angular velocity calculation unit 300. The acceleration calculation unit 200 computes each of the dynamic acceleration components (Acc-x, Acc-y, and Acc-z) and the static acceleration components (Gr-x, Gr-y, and Gr-z) in the three axial directions in the local coordinate system on the basis of the signals (Acc-AC-x, Acc-AC-y, and Acc-AC-z) output from the acceleration detector 11 and the signals (Acc-DC-x, Acc-DC-y, and Acc-DC-z) output from the second acceleration detector 12.

The angular velocity calculation unit 300 computes each of angular velocities (w-x, w-y, and w-z) around the three axes in the local coordinate system on the basis of the signals (Gyro-x, Gyro-y, and Gyro-z) output from the angular velocity detector 31.

The serial interface 201 is configured to be able to successively output the dynamic acceleration components and the static acceleration components computed in the acceleration calculation unit 200 and the angular velocity components computed in the angular velocity calculation unit 300 to the control unit 52. The parallel interface 202 is configured to be able to output the dynamic acceleration components and the static acceleration components computed in the acceleration calculation unit 200 and the angular velocity components computed in the angular velocity calculation unit 300 in parallel to the control unit 52.

The controller 20 may include only at least one of the serial interface 201 or the parallel interface 202, or may selectively switch the interface in accordance with an instruction from the control unit 52. The analog interface 203 is configured to be able to output outputs of the first acceleration detector 11, the second acceleration detector 12, and the angular velocity detector 31 to the control unit 52 without change, and may be omitted as necessary.

[Configuration of Acceleration Sensor 10]

Next, a configuration of the acceleration sensor 10 will be described in detail.

Figure 4:
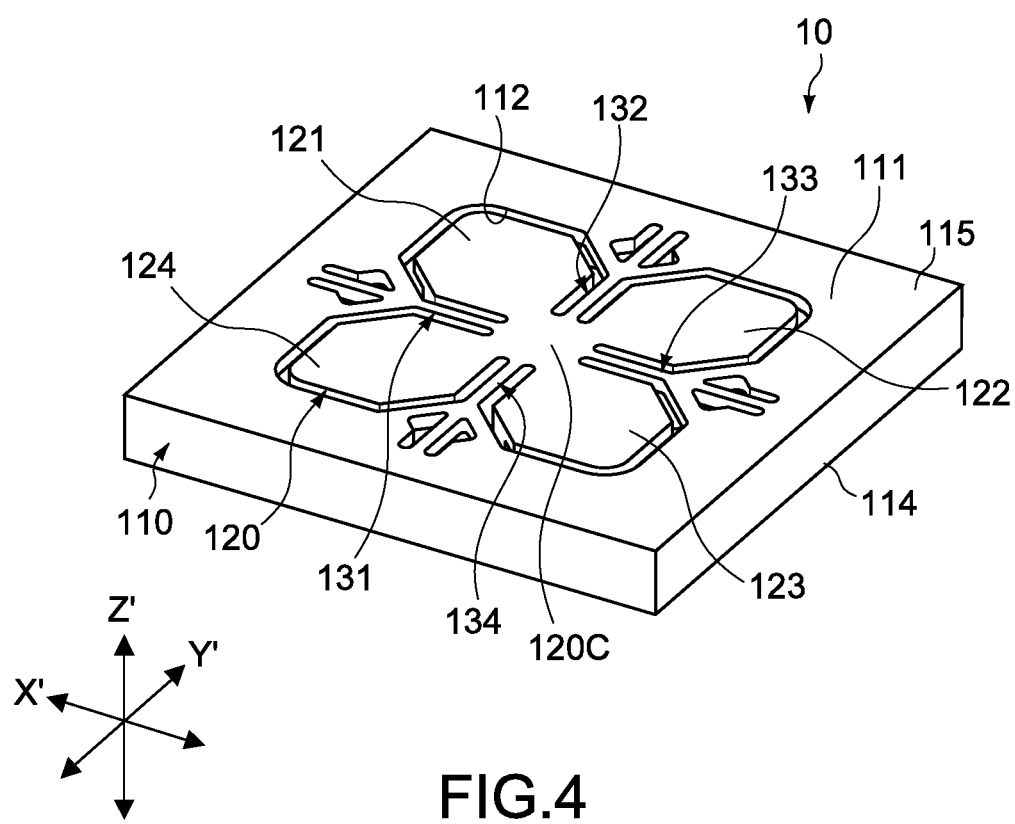
FIG. 4 is a perspective view of a front surface side schematically illustrating a configuration of an acceleration sensor.
Figure 5:
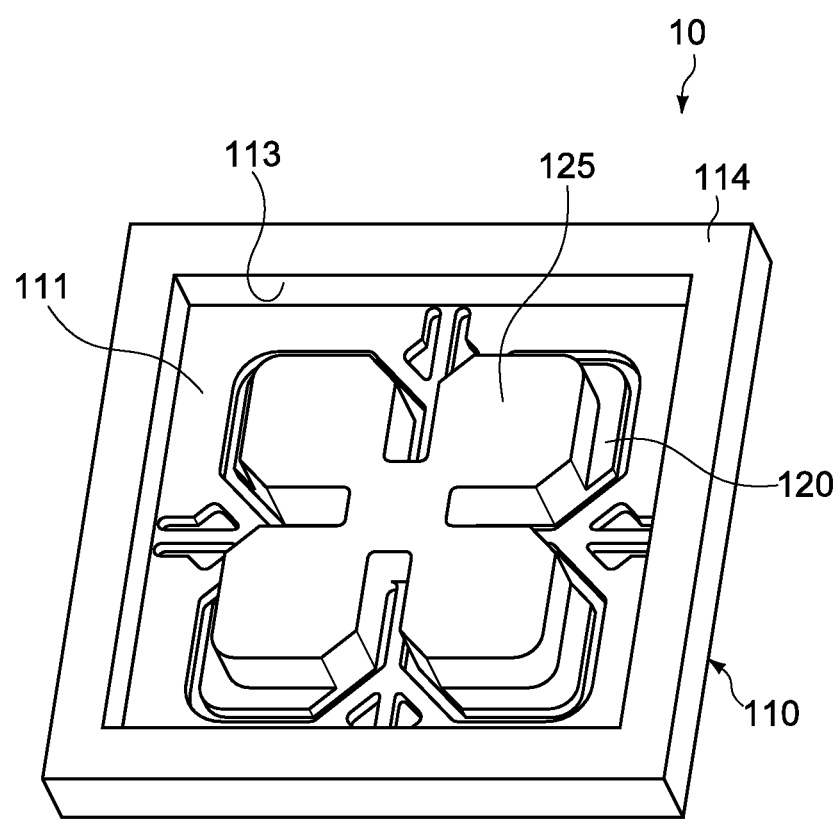
FIG. 5 is a perspective view of a back surface side schematically illustrating the configuration of the acceleration sensor.
Figure 6:
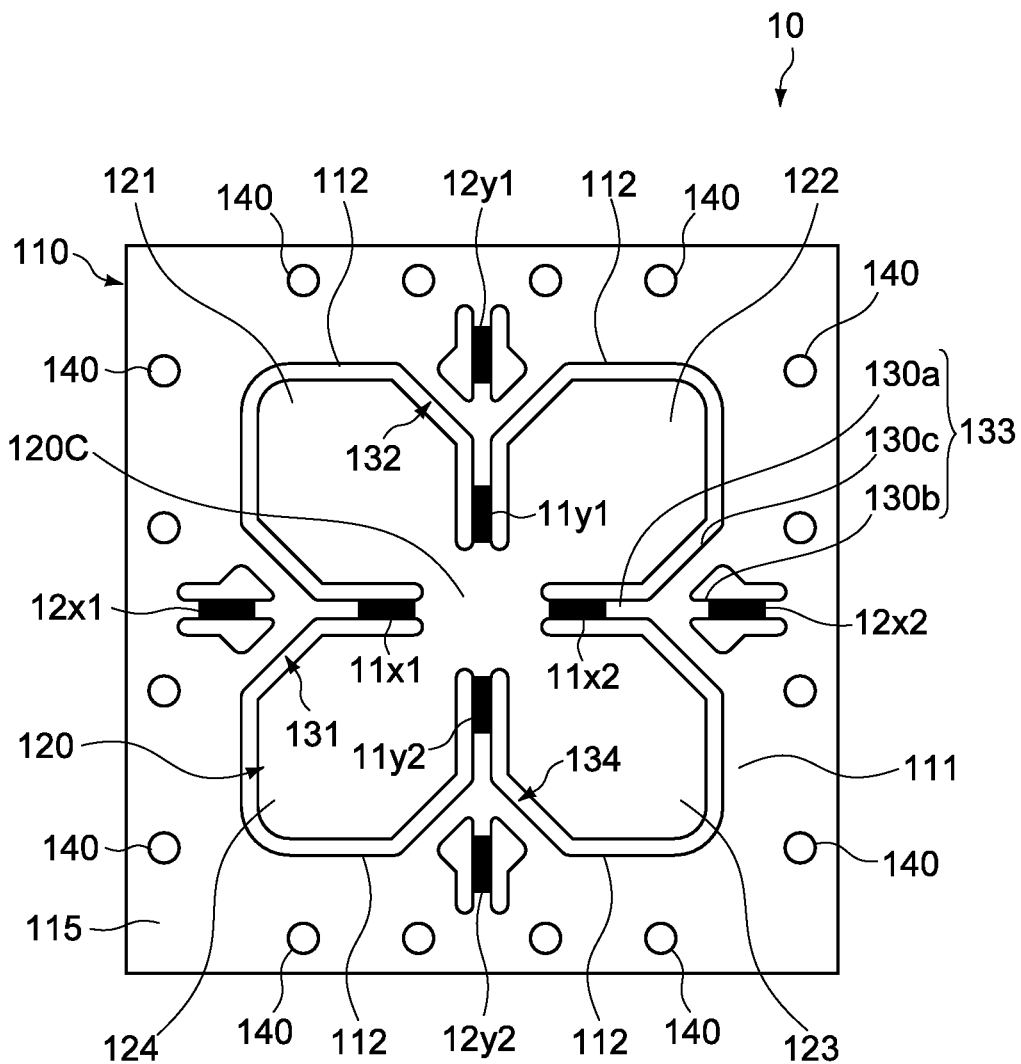
FIG. 6 is a plan view of the front surface side schematically illustrating the configuration of the acceleration sensor.

FIG. 4 to FIG. 6 are a perspective view of a front surface side, a perspective view of a back surface side, and a plan view of the front surface side, respectively, schematically illustrating the configuration of the acceleration sensor 10.

The acceleration sensor 10 includes an element body 110, the first acceleration detector 11 (first detection elements 11x1, 11x2, 11y1, and 11y2), and the second acceleration detector 12 (second detection elements 12x1, 12x2, 12y1, and 12y2).

The element body 110 has a main surface portion 111 parallel to the X'Y' plane and a support portion 114 on the opposite side. The element body 110 is typically formed of a silicon on insulator (SOI) substrate, and includes a stacked structure of an active layer (silicon substrate) forming the main surface portion 111 and a frame-like support layer (silicon substrate) forming the support portion 114. The main surface portion 111 and the support portion 114 have different thicknesses, and the support portion 114 is formed to be thicker than the main surface portion 111.

The element body 110 has a movable plate 120 that can move in response to acceleration. The movable plate 120 is provided at a central portion of the main surface portion 111, and is formed by processing the active layer forming the main surface portion 111 into a predetermined shape. More specifically, the movable plate 120 having a plurality of (in this example, four) blade portions 121 to 124 in a symmetrical shape with respect to the central portion of the main surface portion 111 is configured by a plurality of grooves 112 formed in the main surface portion 111. A peripheral edge portion of the main surface portion 111 is included in a base portion 115 facing the support portion 114 in the Z'-axis direction.

As illustrated in FIG. 5, the support portion 114 is formed in a frame shape having a rectangular recess 113 for opening the back surface of the movable plate 120. The support portion 114 is configured as a bonding surface to be bonded to a support substrate (not illustrated). The support substrate may be configured as a circuit board that electrically connects the acceleration sensor 10 and the controller 20 to each other, or may be configured as a relay substrate or a package substrate electrically connected to the circuit board. Alternatively, the support portion 114 may be provided with a plurality of external connection terminals electrically connected to the circuit board, the relay board, etc.

The blade portions 121 to 124 of the movable plate 120 are respectively formed of plate pieces of a predetermined shape (generally hexagonal shape in this example), and are disposed at intervals of 90° around a central axis parallel to the Z'-axis. A thickness of each of the blade portions 121 to 124 corresponds to a thickness of the active layer included in the main surface portion 111. The respective blade portions 121 to 124 are integrally connected to each other at a central portion 120C of the movable plate 120, and are integrated and supported so as to be movable relative to the base portion 115.

As illustrated in FIG. 5, the movable plate 120 further includes a weight portion 125. The weight portion 125 is integrally provided on a back surface of the central portion of the movable plate 120 and a back surface of each of the blade portions 121 to 124. A size, a thickness, etc. of the weight portion 125 are not particularly limited, and are set to appropriate sizes at which desired vibration characteristics of the movable plate 120 can be obtained. The weight portion 125 is formed, for example, by processing the support layer forming the support portion 114 into a predetermined shape.

As illustrated in FIG. 4 and FIG. 6, the movable plate 120 is connected to the base portion 115 via a plurality of (four in this example) bridge portions 131 to 134. The plurality of bridge portions 131 to 134 are provided between the blade portions 121 to 124, respectively, and are formed by processing the active layer forming the main surface portion 111 into a predetermined shape. The bridge portion 131 and the bridge portion 133 are disposed to face each other in the X'-axis direction, and the bridge portion 132 and the bridge portion 134 are disposed to face each other in the Y'-axis direction.

The bridge portions 131 to 134 form a part of a movable portion that can move relative to the base portion 115, and elastically support the central portion 120C of the movable plate 120. The bridge portions 131 to 134 have the same configuration, and each bridge portion has a first beam portion 130a, a second beam portion 130b, and a third beam portion 130c as illustrated in FIG. 6.

The first beam portion 130a linearly extends from a peripheral edge portion of the central portion 120C of the movable plate 120 in the X'-axis direction or the Y'-axis direction, and is disposed between the mutually adjacent blade portions 121 to 124. The second beam portion 130b linearly extends in the X'-axis direction or the Y'-axis direction, and connects between the first beam portion 130a and the base portion 115.

The third beam portion 130c linearly extends in a direction intersecting each of the X'-axis direction and the Y'-axis direction, and connects between the base portion 115 and an intermediate portion of the first beam portion 130a and the second beam portion 130b. Each of the bridge portions 131 to 134 has two third beam portions 130c, and the two third beam portions 130c are configured to interpose one second beam portion 130b therebetween in the X'Y' plane.

A rigidity of the bridge portions 131 to 134 is set to an appropriate value at which the movable plate 120 in motion can be stably supported. In particular, the bridge portions 131 to 134 are set to an appropriate rigidity that allows deformation by the weight of the movable plate 120, and the magnitude of the deformation is not particularly limited as long as gravitational acceleration by the weight can be detected by the second acceleration detector 12.

As described above, the movable plate 120 is supported by the base portion 115 of the element body 110 through the four bridge portions 131 to 134, and is configured to be able to move (transfer) relative to the base portion 115 using the bridge portions 131 to 134 as fulcrums by an inertia force corresponding to acceleration.

Figure 7A:
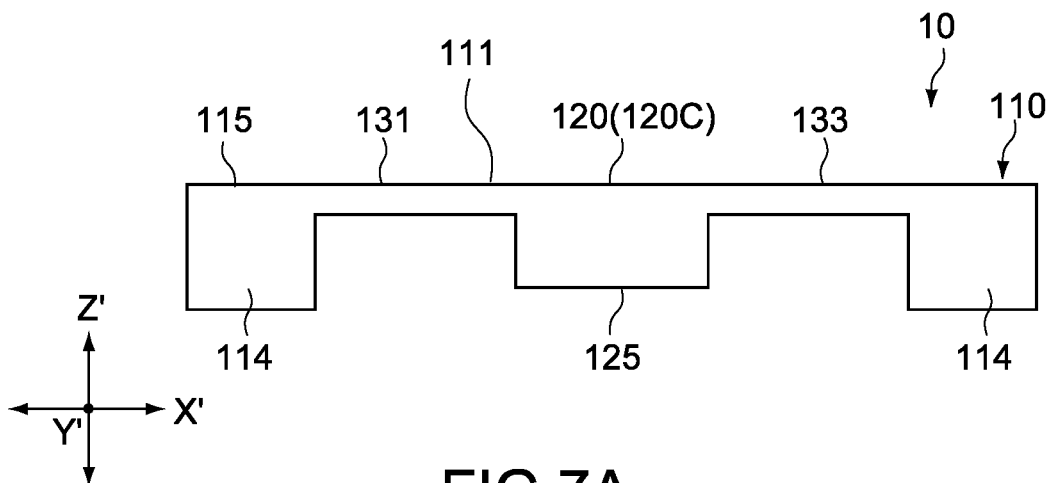
FIG. 7A is a diagram illustrating an appearance when no acceleration is applied in the acceleration sensor.
Figure 7B:
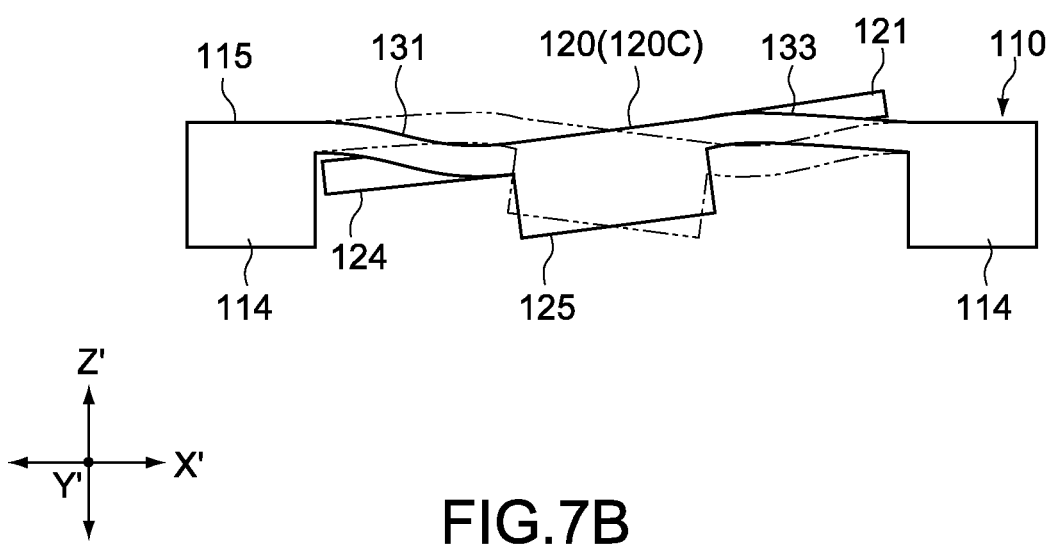
FIG. 7B is a diagram illustrating an appearance when acceleration is generated along an X'-axis direction in the acceleration sensor.
Figure 7C:
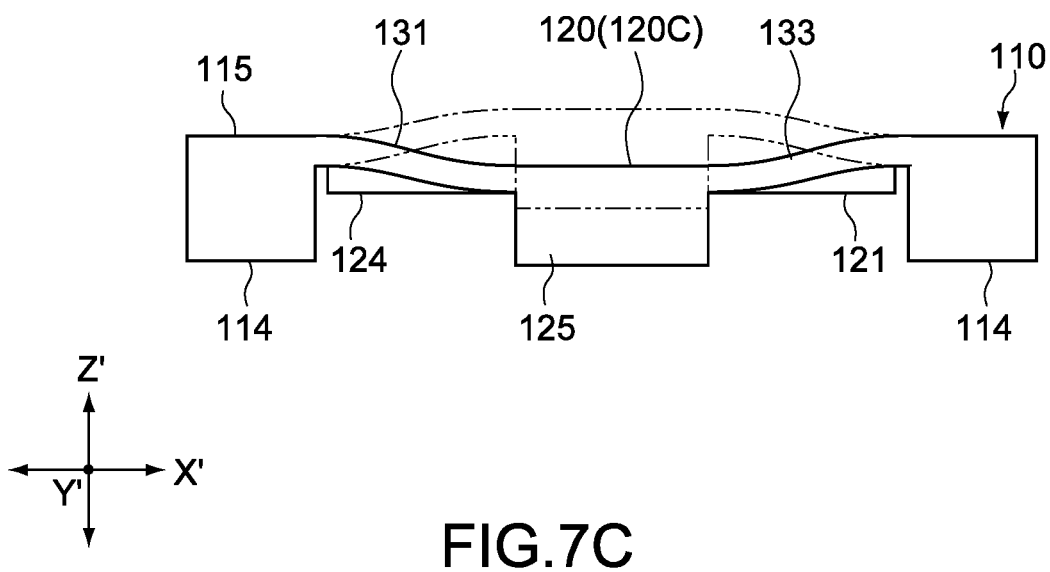
FIG. 7C is a diagram illustrating an appearance when acceleration is generated along a Z'-axis direction in the acceleration sensor.

FIG. 7A to FIG. 7C are schematic side sectional views for description of an appearance of movement of the movable plate 120. FIG. 7A is a diagram illustrating an appearance when no acceleration is applied, and FIG. 7B is a diagram illustrating an appearance when acceleration is generated along the X'-axis direction. In addition, FIG. 7C is a diagram illustrating an appearance when acceleration is generated along the Z'-axis direction.

It should be noted that in FIG. 7B, a solid line indicates an appearance when acceleration is generated in a leftward direction on a paper surface, and a broken line indicates an appearance when acceleration is generated in a rightward direction on the paper surface. Further, in FIG. 7C, a solid line indicates an appearance when acceleration is generated in an upward direction on the paper surface, and a broken line indicates an appearance when acceleration is generated in a downward direction on the paper surface.

When no acceleration is generated, the movable plate 120 is maintained in a state of being parallel to a surface of the base portion 115 as illustrated in FIG. 7A. In this state, for example, when acceleration along the X'-axis direction is generated, the movable plate 120 is inclined counterclockwise around the bridge portions 132 and 134 extending in the Y'-axis direction as illustrated in FIG. 7B. In this way, the bridge portions 131 and 133 facing each other in the X'-axis direction receive bending stresses in mutually opposite directions along the Z'-axis direction.

Similarly, when acceleration along the Y'-axis is generated, although not illustrated, the movable plate 120 is inclined counterclockwise (or clockwise) around the bridge portions 131 and 133 extending in the X'-axis direction, and the bridge portions 132 and 134 facing each other in the Y'-axis direction receive bending stresses in mutually opposite directions along the Z'-axis direction.

On the other hand, when acceleration along the Z'-axis is generated, the movable plate 120 ascends and descends with respect to the base portion 115 as illustrated in FIG. 7C, and each of the bridge portions 131 to 134 receives bending stress in the same direction along the Z'-axis direction.

The first acceleration detector 11 and the second acceleration detector 12 are provided in each of the bridge portions 131 to 134. The acceleration sensor 10 measures an orientation and magnitude of acceleration acting on the acceleration sensor 10 by detecting deformation caused by the bending stresses of the bridge portions 131 to 134 using the first acceleration detector 11 and the second acceleration detector 12.

[Configuration of Acceleration Detectors 11 and 12]

Hereinafter, the first acceleration detector 11 and the second acceleration detector 12 will be described in detail.

As illustrated in FIG. 6, the first acceleration detector 11 includes a plurality of (four in this example) first detection elements 11x1, 11x2, 11y1, and 11y2.

The detection elements 11x1 and 11x2 are provided on axial centers of the surfaces of the two bridge portions 131 and 133 mutually facing each other in the X'-axis direction. One detection element 11x1 is disposed on the first beam portion 130a in the bridge portion 131, and the other detection element 11x2 is disposed on the first beam portion 130a in the bridge portion 133. On the other hand, the detection elements 11y1 and 11y2 are provided on axial centers of the surfaces of the two bridge portions 132 and 134 mutually facing each other in the Y'-axis direction. One detection element 11y1 is disposed on the first beam portion 130a in the bridge portion 132, and the other detection element 11y2 is disposed on the first beam portion 130a in the bridge portion 134.

Each of the first detection elements 11x1 to 11y2 has the same configuration, and in the present embodiment, is configured as a rectangular piezoelectric detection element having a long side in an axial center direction of the first beam portion 130a. The first detection elements 11x1 to 11y2 include a stacked body of a lower electrode layer, a piezoelectric film, and an upper electrode layer.

The piezoelectric film typically includes lead zirconate titanate (PZT), and is not limited thereto. The piezoelectric film generates a potential difference between the upper electrode layer and the lower electrode layer according to the amount of bending deformation (stress) in the Z'-axis direction of the first beam portion 130a (piezoelectric effect) . The upper electrode layer is electrically connected to a relay terminal 140 provided on the surface of the base portion 115 through a wiring layer (not illustrated) formed on each of the bridge portions 131 to 134. The relay terminal 140 may be configured as an external connection terminal electrically connected to the support substrate. For example, the other end of a bonding wire whose one end is connected to the support substrate is connected thereto. The lower electrode layer is typically connected to a reference potential such as a ground potential.

The first acceleration detector 11 configured as described above performs outputting only when there is a change in stress due to a characteristic of the piezoelectric film, and does not perform outputting in a state in which a stress value is not changed even when stress is applied. Thus, the first acceleration detector 11 mainly detects the magnitude of the motion acceleration acting on the movable plate 120. Therefore, the output of the first acceleration detector 11 mainly includes an output signal having an AC waveform which is an AC component according to the motion acceleration.

On the other hand, as illustrated in FIG. 6, the second acceleration detector 12 has a plurality of (four in this example) second detection elements 12x1, 12x2, 12y1, and 12y2.

The detection elements 12x1 and 12x2 are provided on the axial centers of the surfaces of the two bridge portions 131 and 133 mutually facing each other in the X'-axis direction. One detection element 12x1 is disposed on the second beam portion 130b in the bridge portion 131, and the other detection element 12x2 is disposed on the second beam portion 130b in the bridge portion 133. On the other hand, the detection elements 12y1 and 12y2 are provided on the axial centers of the surfaces of the two bridge portions 132 and 134 mutually facing each other in the Y'-axis direction. One detection element 12y1 is disposed on the second beam portion 130b in the bridge portion 132, and the other detection element 12y2 is disposed on the second beam portion 130b in the bridge portion 134.

The second detection elements 12x1 to 12y2 have the same configuration, and in the present embodiment, are configured as piezoresistive detection elements having long sides in as axial center direction of the second beam portion 130b. Each of the second detection elements 12x1 to 12y2 has a resistance layer and a pair of terminal portions connected to both ends thereof in the axial direction.

The resistance layer is, for example, a conductor layer formed by doping the surface (silicon layer) of the second beam portion 130b with an impurity element, and causes a resistance change according to the amount of bending deformation (stress) of the second beam portion 130b in the Z'-axis direction between the pair of terminal portions (piezoresistive effect). The pair of terminal portions is electrically connected to relay terminals 140 provided on the surface of the base portion 115 through wiring layers (not illustrated) formed on the bridge portions 131 to 134, respectively.

Since a resistance value is determined by an absolute stress value due to a characteristic of a piezoresistance, the second acceleration detector 12 configured as described above detects not only the motion acceleration acting on the movable plate 120 but also gravitational acceleration acting on the movable plate 120. Therefore, an output of the second acceleration detector 1211 has an output waveform in which a dynamic component (AC component) corresponding to the motion acceleration is superimposed on a gravitational acceleration or a static component (DC component) corresponding thereto.

It should be noted that the second detection elements 12x1 to 12y2 are not limited to the example of being configured as piezoresistive detection elements, and may be configured as, for example, other non-piezoelectric detection elements capable of detecting acceleration of the DC component such as electrostatic detection elements. In the case of the electrostatic type, a movable electrode portion and a fixed electrode portion included in an electrode pair are disposed to be face each other in the axial direction of the second beam portion 130b, and are configured such that a facing distance between the two electrode portions changes in accordance with the amount of bending deformation of the second beam portion 130b.

In the present embodiment, the piezoelectric acceleration sensor 10 is adopted for the first acceleration detector 11, and the non-piezoelectric (piezoresistive or electrostatic capacitive) acceleration sensor 10 is adopted as the second acceleration detector 12. Thus, it is possible to obtain an inertial sensor having a wide dynamic range and high sensitivity in a low frequency region.

The first acceleration detector 11 outputs each of the respective acceleration detection signals (Acc-AC-x, Acc-AC-y, and Acc-AC-z) in the X'-axis direction, the Y'-axis direction, and the Z'-axis direction to the controller 20 on the basis of the outputs of the first detection elements 11x1 to 11y2 (see FIG. 3).

The acceleration detection signal (Acc-AC-x) in the X'-axis direction corresponds to a difference signal (ax1-ax2) between the output (ax1) of the detection element 11x1 and the output (ax2) of the detection element 11x2. The acceleration detection signal (Acc-AC-y) in the Y'-axis direction corresponds to a difference signal (ay1-ay2) between the output (ay1) of the detection element 11y1 and the output (ay2) of the detection element 11y2. Further, the acceleration detection signal (Acc-AC-z) in the Z'-axis direction corresponds to a sum (ax1+ax2+ay1+ay2) of the outputs of the detection elements 11x1 to 11y2.

Similarly, the second acceleration detector 12 outputs each of the respective acceleration detection signals (Acc-DC-x, Acc-DC-y, and Acc-DC-z) in the X'-axis direction, the Y'-axis direction, and the Z'-axis direction to the controller 20 on the basis of the outputs of the second detection elements 12x1 to 12y2 (see FIG. 3).

The acceleration detection signal (Acc-DC-x) in the X'-axis direction corresponds to a difference signal (bx1-bx2) between the output (bx1) of the detection element 12x1 and the output (bx2) of the detection element 12x2. The acceleration detection signal (Acc-DC-y) in the Y'-axis direction corresponds to a difference signal (by1-by2) between the output (by1) of the detection element 12y1 and the output (by2) of the detection element 12y2. Further, the acceleration detection signal (Acc-DC-z) in the Z'-axis direction corresponds to a sum (bx1+bx2+by1+by2) of the outputs of the detection elements 12x1 to 12y2.

[Configuration of Acceleration Calculation Unit 200]

Figure 8:
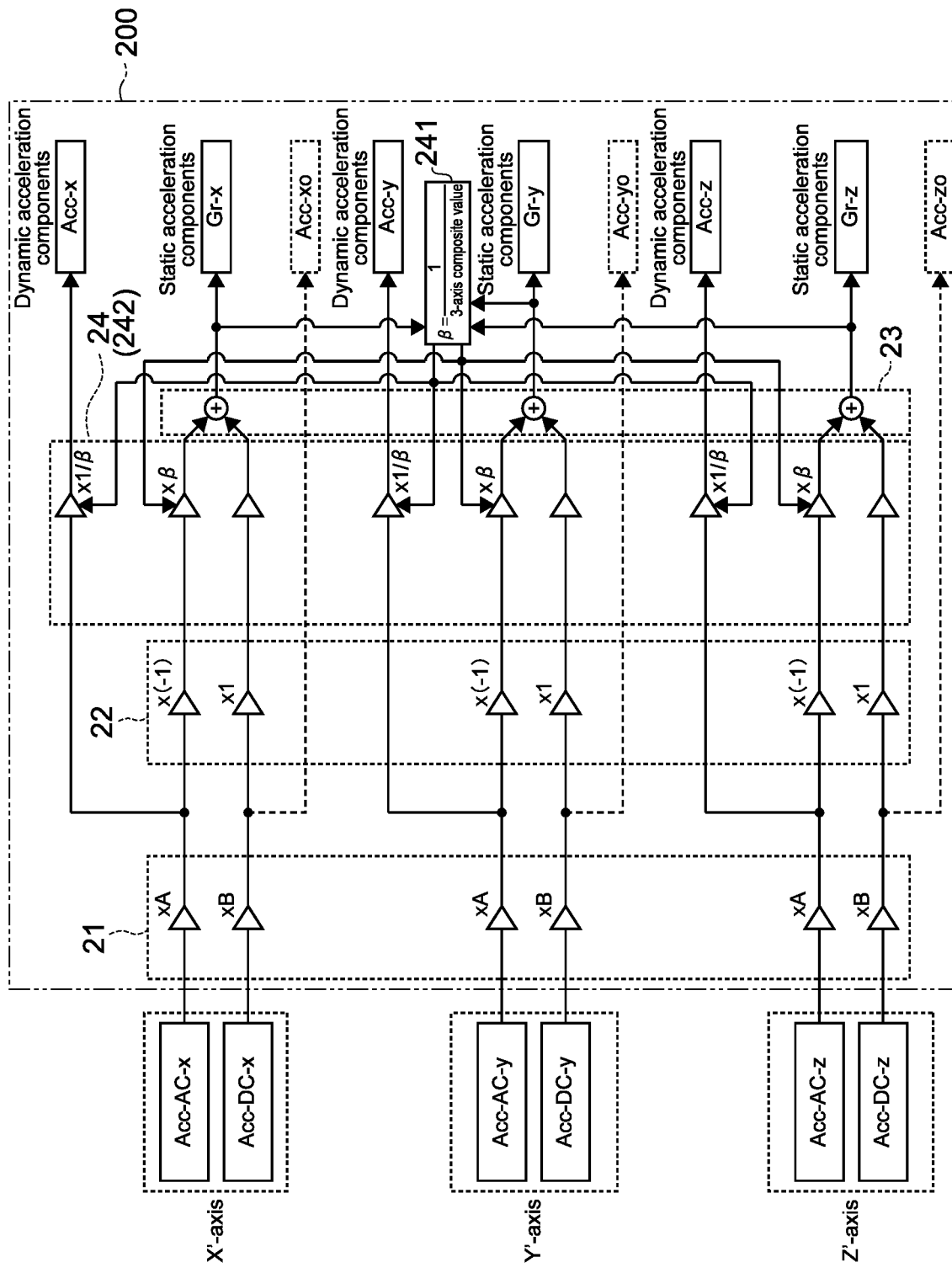
FIG. 8 is a circuit diagram illustrating a configuration example of an acceleration calculation unit.

Next, a description will be given of a configuration of the acceleration calculation unit 200 of the controller 20 in the sensor unit 40. FIG. 8 is a circuit diagram illustrating a configuration example of the acceleration calculation unit 200.

The acceleration calculation unit 200 has a gain adjustment circuit 21, a sign inversion circuit 22, an addition circuit 23, and a correction circuit 24. These circuits 21 to 24 have a configuration common to the respective axes of the X'-axis, Y'-axis, and the Z'-axis, and dynamic acceleration components (motion acceleration components) and static acceleration components (gravitational acceleration components) of each axis are computed by performing common calculation processing in each axis.

Figure 9:
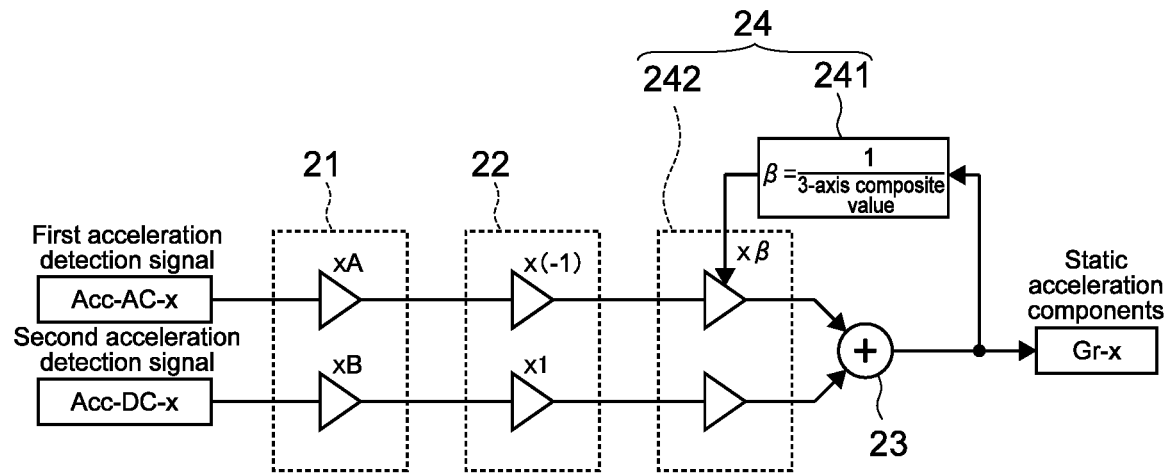
FIG. 9 is a diagram illustrating a processing block for computing static acceleration components from an acceleration detection signal in the X'-axis direction.

Hereinafter, a processing circuit for the acceleration detection signals in the X'-axis direction will be representatively described as an example. FIG. 9 illustrates a processing block for computing static acceleration components from an acceleration detection signal in the X'-axis direction.

The gain adjustment circuit 21 adjusts gain of each signal such that the first acceleration detection signal (Acc-AC-x) in the X'-axis direction output from the first acceleration detector 11 (11x1 and 11x2) and the second acceleration detection signal (Acc-DC-x) in the X'-axis direction output from the second acceleration detector 12 (12x1 and 12x2) have the same level. The gain adjustment circuit 21 has an amplifier for amplifying the output (Acc-AC-x) of the first acceleration detector 11 and the output (Acc-DC-x) of the second acceleration detector 12.

Figure 10:
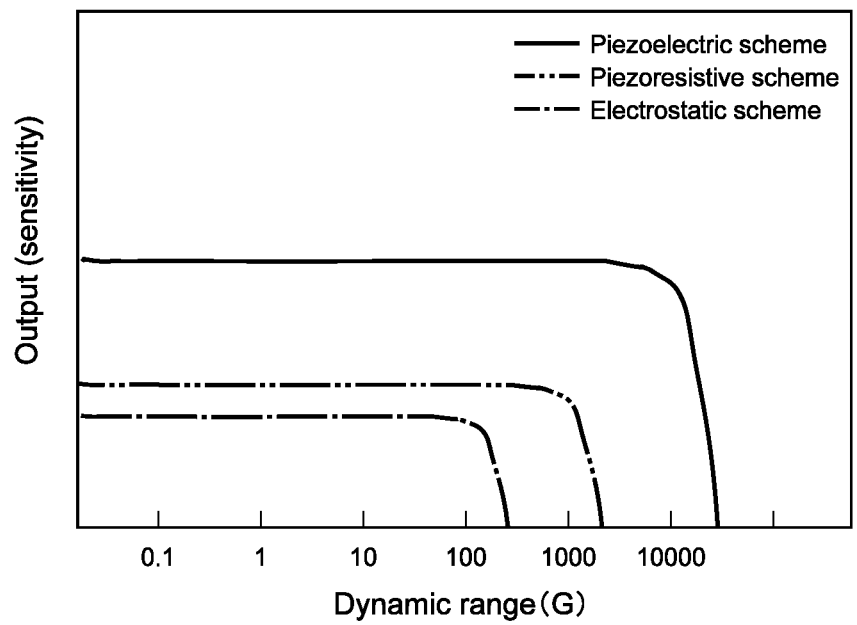
FIG. 10 is a diagram for description of an action of the acceleration calculation unit.

In general, output sensitivity and a dynamic range of the acceleration sensor 10 differ in a manner that depends on the detection scheme. For example, as illustrated in FIG. 10, the output sensitivity is higher and the dynamic range is wider (larger) in the piezoelectric acceleration sensor 10 than in the non-piezoelectric (piezoresistive or electrostatic) acceleration sensor 10. In the present embodiment, the first acceleration detector 11 corresponds to the piezoelectric acceleration sensor 10, and the second acceleration detector 12 corresponds to the piezoresistive acceleration sensor 10.

Therefore, the gain adjustment circuit 21 multiplies the outputs of the respective acceleration detectors 11 and 12 (first and second acceleration detection signals) by A times and B times, respectively, so that the outputs of the acceleration detectors 11 and 12 have the same level. The amplification factors A and B are positive numbers and satisfy a relationship of A<B. Values of the amplification factors A and B are not particularly limited, and may be set as coefficients that serve as temperature compensation of each of the acceleration detectors 11 and 12 in a manner that depends on the use environment (use temperature) of the acceleration sensor 10.

Figure 11:
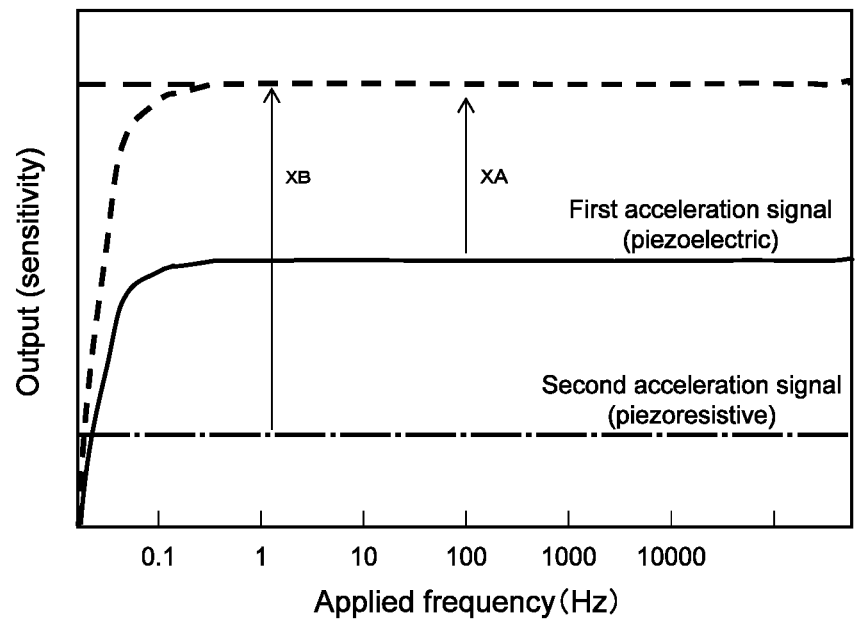
FIG. 11 is a diagram for description of an action of the acceleration calculation unit.

FIG. 11 is an example of the output characteristics of the first acceleration detection signal and the second acceleration detection signal, and illustrates the output characteristics before gain adjustment and the output characteristics after gain adjustment in comparison. In the figure, a horizontal axis indicates a frequency of acceleration acting on the acceleration sensor 10, and a vertical axis indicates an output (sensitivity) (this description is similarly applied to FIGS. 12 to 15).

As illustrated in FIG. 11, in the piezoelectric first acceleration detection signal (Acc-AC-x), output sensitivity of acceleration components in a low frequency region of 0.5 Hz or less is lower than output sensitivity of acceleration components in a higher frequency region. In particular, output sensitivity a stopped state (motion acceleration 0) is approximately zero. On the other hand, since the piezoresistive second acceleration detection signal (Acc-DC-x) has constant output sensitivity over the entire frequency range, acceleration components in the stopped state (that is, the gravitational acceleration) can be detected at the constant output sensitivity. Therefore, by amplifying each of the first acceleration detection signal and the second acceleration detection signal by a predetermined magnification to obtain the same output level in the gain adjustment circuit 21, the gravitational acceleration can be computed in a difference calculation circuit described below.

The sign inversion circuit 22 and the addition circuit 23 are included in the difference calculation circuit which computes static acceleration components (DC components) from acceleration in each axial direction on the basis of a difference signal between the first acceleration detection signal (Acc-AC-x) and the second acceleration detection signal (Acc-DC-x).

Figure 12:
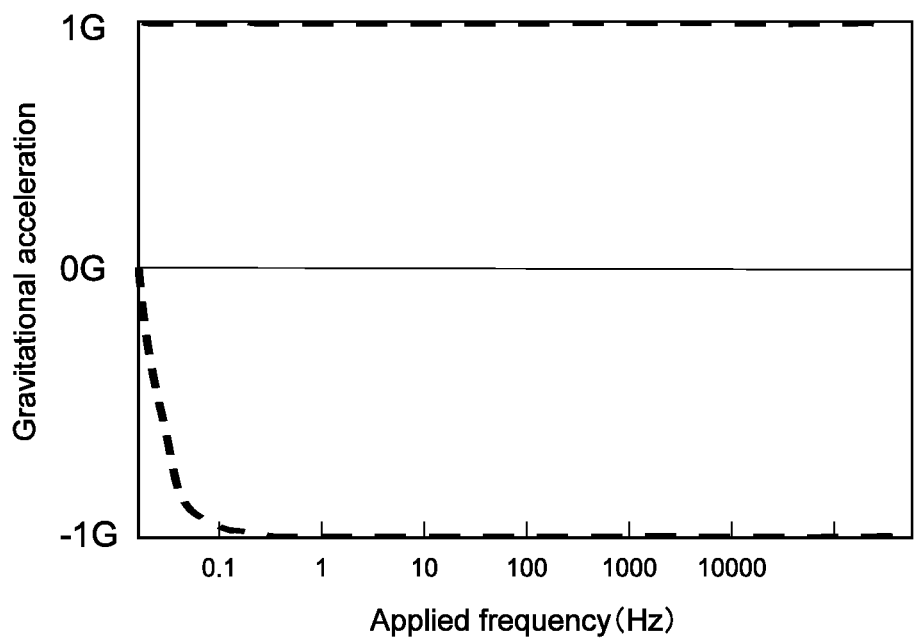
FIG. 12 is a diagram for description of an action of the acceleration calculation unit.

The sign inversion circuit 22 has an inversion amplifier (amplification factor: −1) that inverts the sign of the first acceleration detection signal (Acc-AC-x) after gain adjustment. FIG. 12 illustrates an example of the output characteristic of the first acceleration detection signal (Acc-AC-x) after sign inversion. Here, a case in which the acceleration sensor 10 detects acceleration of 1 G in the X'-axis direction is described as an example.

It should be noted that the second acceleration detection signal (Acc-DC-x) is output to the addition circuit 23 in a subsequent stage without inversion of the sign. The sign inversion circuit 22 may be configured in common with the gain adjustment circuit 21 in a preceding stage.

Figure 13:
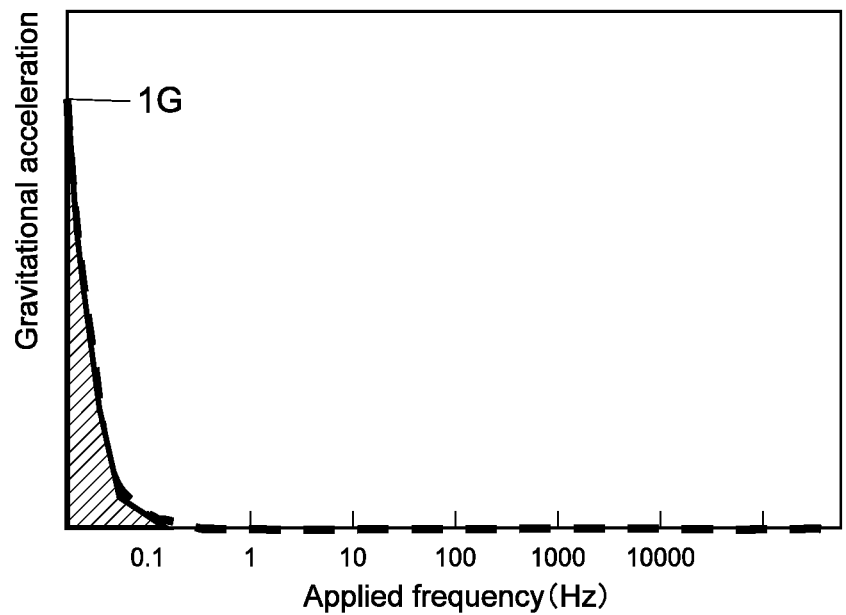
FIG. 13 is a diagram for description of an action of the acceleration calculation unit.

The addition circuit 23 adds the first acceleration detection signal (Acc-AC-x) and the second acceleration detection signal (Acc-DC-x) output from the sign inversion circuit 22 to output static acceleration components. FIG. 13 illustrates an example of the output characteristic of the addition circuit 23. Since the first and second acceleration detection signals are adjusted to the same level in the gain adjustment circuit 21, a net static acceleration component (Gr-x) is computed by obtaining these difference signals. The static acceleration components typically correspond to gravitational acceleration components or acceleration components including the gravitational acceleration.

Figure 14:
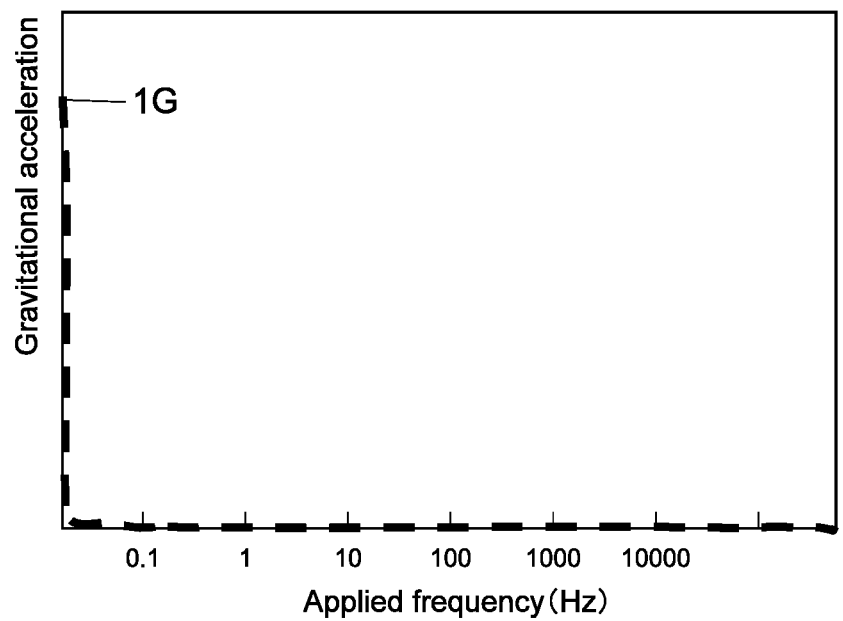
FIG. 14 is a diagram for description of an action of the acceleration calculation unit.

When the static acceleration components output from the addition circuit 23 correspond to only gravitational acceleration, theoretically, an output of a significant acceleration component appears only near 0 Hz as illustrated in FIG. 14. However, in practice, since detection sensitivity of the first acceleration detector 11 having a piezoelectric detection type in the vicinity of a low frequency is low, and acceleration components in axial directions other than a target axis (here, the Y'-axis direction and the Z'-axis direction) unavoidably overlap due to generation of the other axis sensitivity, dynamic acceleration components in a frequency region indicated by hatching in FIG. 13 leaks into an output of the addition circuit 23 as an error component. Therefore, in the present embodiment, the correction circuit 24 for canceling the error on the basis of the output of the addition circuit 23 is provided.

The correction circuit 24 includes a 3-axis composite value calculation unit 241 and a low band sensitivity correction unit 242. The correction circuit 24 compute a correction coefficient β on the basis of the output of the addition circuit 23 (the difference signal between the first and second acceleration detection signals), and corrects the first acceleration detection signal (Acc-AC-x) using the correction coefficient β.

The 3-axis composite value calculation unit 241 is commonly provided for processing blocks that compute static acceleration components in all the X'-axis, Y'-axis, and Z'-axis directions, and computes the correction coefficient β using a sum value of the outputs (the difference signal between the first and second acceleration detection signals) of the addition circuit 23 in the respective axes.

Specifically, the 3-axis composite value calculation unit 241 computes a composite value ($\sqrt{((Gr\text{-}x)^2+(Gr\text{-}y)^2+(Gr\text{-}z)^2)}$) of the static acceleration components (Gr-x, Gr-y, and Gr-z) in the three axial directions, and regards a portion of the composite value exceeding 1 G as a low band sensitivity error portion (area indicated by hatching in FIG. 13) to compute the correction coefficient β corresponding to a reciprocal of the composite value.

$\beta=1/(\sqrt{((Gr\text{-}x)^2+(Gr\text{-}y)^2+(Gr\text{-}z)^2)})$

It should be noted that values of the static acceleration components (Gr-x, Gr-y, and Gr-z) in the three respective axial directions differ in a manner that depends on the attitude of the acceleration sensor 10, and momentarily change in accordance with an attitude change of the acceleration sensor 10. For example, when the Z'-axis direction of the acceleration sensor 10 coincides with a gravity direction (vertical direction), the static acceleration component (Gr-z) in the Z'-axis direction indicates a larger value than the static acceleration components (Gr-x and Gr-y) in the X'-axis direction and the Y'-axis direction. In this way, it is possible to determine the gravity direction of the acceleration sensor 10 at the time from the values of the static acceleration components (Gr-x, Gr-y, and Gr-z) in the three respective axial directions.

The low band sensitivity correction unit 242 has a multiplier that multiplies the correction coefficient β by the first acceleration detection signal (Acc-AC-x) whose sign is inverted. In this way, the first acceleration detection signal is input to the addition circuit 23 in a state in which a low band sensitivity error is reduced, and thus an acceleration signal having a frequency characteristic illustrated in FIG. 14 is output from the addition circuit 23. In this way, since only the gravitational acceleration corresponding to the gravitational acceleration is output, computation accuracy of the gravitational acceleration components is improved.

In the present embodiment, the correction circuit 24 is configured to execute a process of multiplying the first acceleration detection signal by the correction coefficient β at the time of calculating the static acceleration components. However, the present technology is not limited thereto. The correction circuit 24 may be configured to execute a process of multiplying the second acceleration detection signal (Acc-DC-x) by the correction coefficient β, or the acceleration detection signal to be corrected may be switched between the first acceleration detection signal and the second acceleration detection signal in accordance with a magnitude of an acceleration change.

The correction circuit 24 is configured to correct the first acceleration detection signal using the correction coefficient β when the change in acceleration of either one of the first acceleration detection signal and the second acceleration detection signal is greater than or equal to a predetermined value. The larger the change in acceleration (the higher an applied frequency), the higher a rate at which an error component leaks into the first acceleration detection signal. Thus, the error component can be efficiently reduced. The configuration is particularly effective when the motion acceleration is relatively large.

Meanwhile, the correction circuit 24 is configured to correct the second acceleration detection signal using the correction coefficient β when the change in acceleration of either one of the first acceleration detection signal and the second acceleration detection signal is less than or equal to a predetermined value. The smaller the change in acceleration (the lower the applied frequency), the higher a rate at which the error component leaks into the second acceleration detection signal. Thus, the error component can be efficiently reduced. The configuration is particularly effective when the motion acceleration is relatively small.

The static acceleration component in each axis direction is computed as described above. However, for computation of the dynamic acceleration components (Acc-x, Acc-y, and Acc-z) in the respective axial direction, as illustrated in FIG. 8, the first acceleration detection signals (Acc-AC-x, Acc- AC-y, and Acc-AC-z) whose gains are adjusted in the gain adjustment circuit 21 are referred to.

Here, even though the first acceleration detection signal may be used without change for computation of the dynamic acceleration components, since some of the dynamic acceleration components may leak into the static acceleration components as described above in some cases, the dynamic acceleration components decrease, so that highly accurate detection becomes difficult. Therefore, by correcting the first acceleration detection signal using the correction coefficient β computed in the correction circuit 24, it is possible to achieve the detection accuracy of the dynamic acceleration components.

Figure 15:
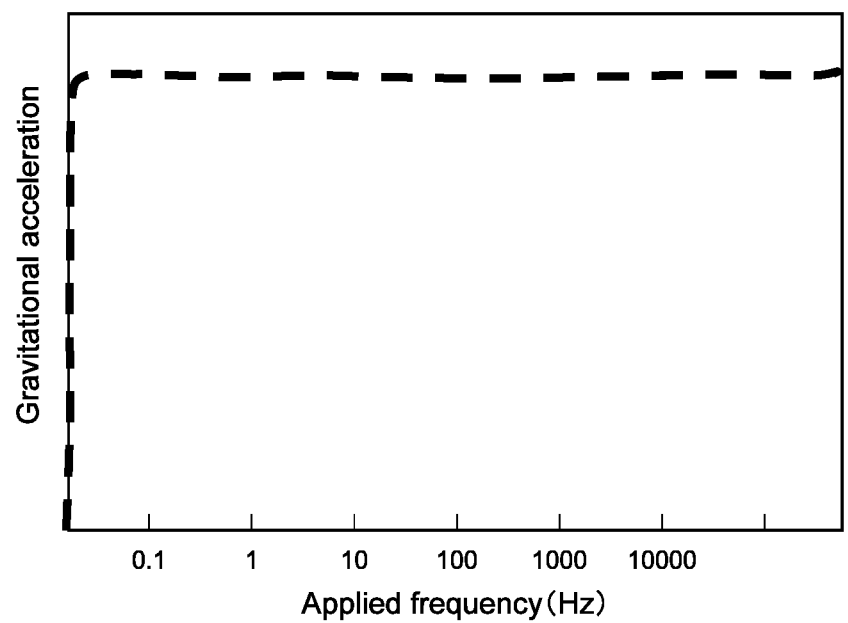
FIG. 15 is a diagram for description of an action of the acceleration calculation unit.

More specifically, as illustrated in FIG. 8, the correction circuit 24 (the low band sensitivity correction unit 242) has the multiplier that multiplies the reciprocal (1/β) of the correction coefficient β acquired by the 3-axis composite value calculation unit 241 by the first acceleration signals (Acc-AC-x, Acc-AC-y, and Acc-AC-z). In this way, a low band sensitivity component of the first acceleration signal is compensated, and thus the computation accuracy of the dynamic acceleration components (Acc-x, Acc-y, and Acc-z) is improved. The output characteristics of the dynamic acceleration components are schematically illustrated in FIG. 15.

It is presumed that a process of correcting the dynamic acceleration components and the static acceleration components by the low band sensitivity correction unit 242 is typically effective when the composite value computed by the 3-axis composite value calculation unit 241 is other than 1 G (G: gravitational acceleration). It should be noted that examples of a case in which the composite value is less than 1 G include a case in which the sensor element 10 is falling free, etc.

<Description of Operation>

Figure 16:
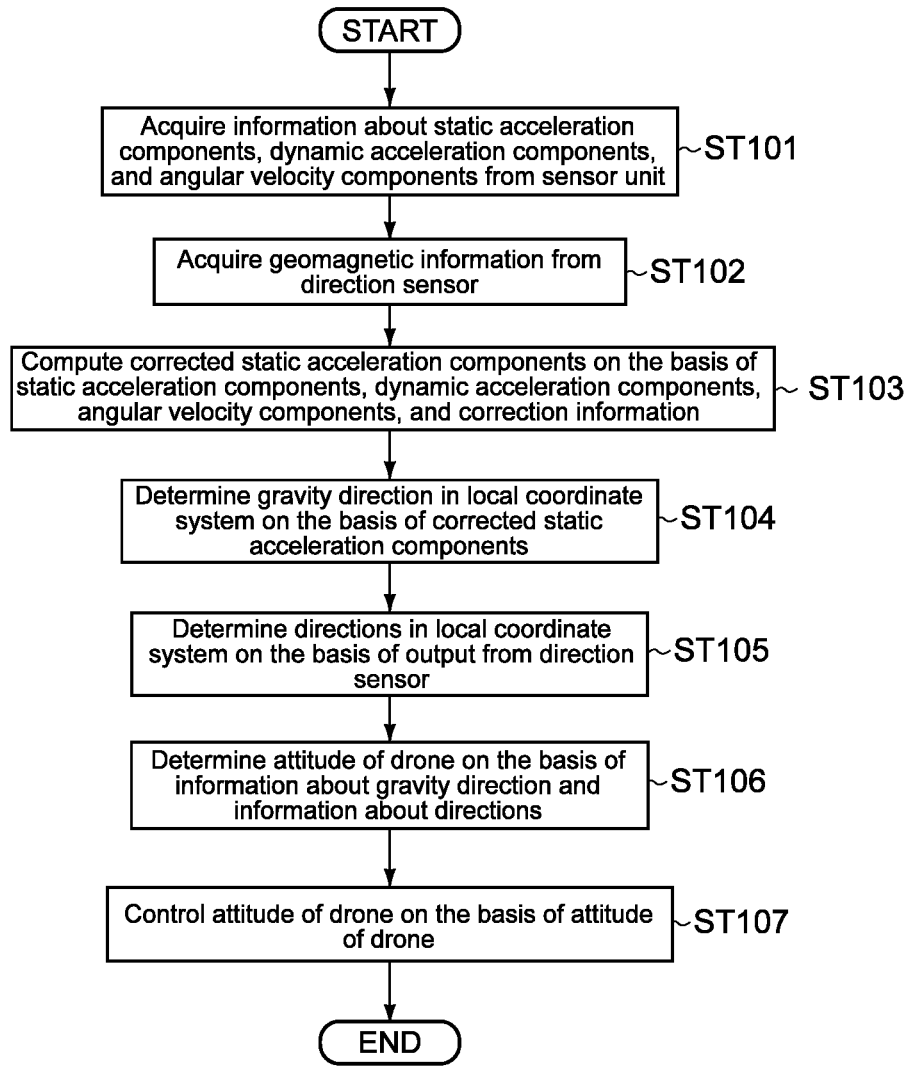
FIG. 16 is a flowchart illustrating processing of a control unit of a drone according to a first embodiment.

Next, a description will be given of processing of the control unit 52 of the drone 50. FIG. 16 is a flowchart illustrating processing of the control unit 52 of the drone 50 according to the first embodiment.

When the system is activated by turning ON power and flight of the drone 50 is started, the control unit 52 acquires information about the static acceleration components (Gr-x, Gr-y, and Gr-z), the dynamic acceleration components (Acc-x, Acc-y, and Acc-z,) and the angular velocity components ($\omega_x$, $\omega_y$, and $\omega_z$) output from the sensor unit 40 at a predetermined clock cycle (step 101). Further, the control unit 52 acquires geomagnetic information output from the direction sensor 53 at a predetermined clock cycle (step 102).

Subsequently, the control unit 52 computes corrected static acceleration components (Gr-x', Gr-y', and Gr-z') on the basis of nine elements of the static acceleration components (Gr-x, Gr-y, and Gr-z), the dynamic acceleration components (Acc-x, Acc-y, and Acc-z,) and the angular velocity components ($\omega_x$, $\omega_y$, and $\omega_z$) and correction information for correcting the static acceleration components (step 103).

In this case, for example, the control unit 52 executes calculation of a matrix $Y^T = MX^T$ using a matrix M (correction information) having nine rows and three columns, and a transposed matrix $X^T$ of a vector of nine elements (Gr-x, Gr-y, Gr-z, Acc-x, Acc-y, Acc-z, $\omega_x$, $\omega_y$, and $\omega_z$) to obtain a transposed matrix $Y^T$ of the corrected static acceleration components (Gr-x', Gr-y', and Gr-z').

Alternatively, the control unit 52 executes calculation of a matrix $Y^T = NX^T + Z^T$ using a matrix N (correction information), the transposed matrix $X^T$, and a transposed matrix $Z^T$ of the static acceleration components (Gr-x, Gr-y, and Gr-z) (before correction) to obtain the transposed matrix $Y^T$ of the corrected static acceleration components (Gr-x', Gr-y', and Gr-z').

It should be noted that in the present embodiment, the matrix M and the matrix N are values prepared in advance, and are stored in the storage unit 55. In the present embodiment, the matrix M and the matrix N correspond to correction information for correcting the static acceleration components (Gr-x, Gr-y, and Gr-z) by using the dynamic acceleration components (Acc-x, Acc-y, and Acc-z) and the angular velocity components ($\omega_x$, $\omega_y$, and $\omega_z$). It should be noted that in the present embodiment, the static acceleration components are corrected by both the dynamic acceleration components and the angular velocity components. However, the static acceleration components may be corrected by one of the dynamic acceleration components and the angular velocity components.

When the transposed matrix $Y^T$ is obtained, the control unit 52 obtains the corrected static acceleration components (Gr-x', Gr-y', and Gr-z') on the basis of the transposed matrix $Y^T$.

It should be noted that the nine elements (Gr-x, Gr-y, Gr-z, Acc-x, Acc-y, Acc-z, $\omega_x$, $\omega_y$, and $\omega_z$) used when the corrected static acceleration components (Gr-x', Gr-y', and Gr-z') are obtained may correspond to a set of nine elements at a current time or a plurality of sets of nine elements from a predetermined time before the current time to the current time.

When the corrected static acceleration components are computed, the control unit 52 subsequently determines a gravity direction in the local coordinate system on the basis of the corrected static acceleration components (Gr-x', Gr-y', and Gr-z') (step 104). In this case, typically, the control unit 52 determines that a direction in which a vector of a composite value ($\sqrt{((Gr\text{-}x')^2 + (Gr\text{-}y')^2 + (Gr\text{-}z')^2)}$) of the corrected static acceleration components is directed corresponds to the gravity direction in the local coordinate system.

In the description of the present embodiment, a description has been given of a case in which the gravity direction is determined on the basis of the corrected static acceleration components (Gr-x', Gr-y', and Gr-z'). However, the gravity direction may be determined on the basis of the static acceleration components (Gr-x, Gr-y, and Gr-z) which are not corrected (this description is similarly applied to respective embodiments below). In this case, the control unit 52 determines that a direction in which a vector of a composite value ($\sqrt{((Gr\text{-}x)^2 + (Gr\text{-}y)^2 + (Gr\text{-}z)^2)}$) of the static acceleration components is directed corresponds to the gravity direction in the local coordinate system.

When the gravity direction in the local coordinate system is determined, the control unit 52 subsequently determines directions (north, south, east, and west) in the local coordinate system on the basis of an output from the direction sensor 53 (step 105).

Subsequently, the control unit 52 determines the attitude of the drone 50 in the global coordinate system on the basis of information about the gravity direction in the local coordinate system and information about the directions in the local coordinate system (step 106).

In this instance, for example, the control unit 52 aligns the local coordinate system with the global coordinate system by rotating the local coordinate system so that the gravity direction in the local coordinate system coincides with the gravity direction in the global coordinate system, and determines the attitude of the drone 50 in the global coordinate system.

An orientation of the drone 50 in the global coordinate system may not be determined merely by aligning the gravity direction in the local coordinate system with the gravity direction in the global coordinate system, and thus information about directions is used to determine this direction. In this case, for example, the control unit 52 aligns the local coordinate system with the global coordinate system by rotating the local coordinate system so that the orientation in the local coordinate system coincides with the orientation in the global coordinate system, and determines a final attitude (attitude including the orientation) in the drone 50 in the global coordinate system.

When the attitude of the drone 50 in the global coordinate system is determined, the control unit 52 controls the attitude of the drone 50 on the basis of the attitude of the drone 50 (step 107). For example, in the case of determining that a current attitude is not a basic attitude even though an instruction from the remote controller 60 is an instruction to fly in the basic attitude, the control unit 52 executes a process of controlling rotation of the motor 58 to return the attitude to the basic attitude.

<Action, etc.>

As described above, in the present embodiment, the static acceleration components are computed from two signals corresponding to the first acceleration detection signal obtained by detecting the dynamic acceleration components acting on the drone 50 and the second acceleration detection signal obtained by detecting the dynamic acceleration components and the static acceleration components acting on the drone 50.

For this reason, it is possible to accurately compute the static acceleration components that can be regarded as the gravitational acceleration components. Therefore, in the present embodiment, the control unit 52 can accurately determine the gravity direction of the drone 50 in the local coordinate system, and thus can accurately determine the attitude of the drone 50 in the global coordinate system. Accordingly, the control unit 52 can accurately control the attitude of the drone 50 in the global coordinate system.

Here, a case in which a general acceleration sensor is used will be described as a comparison. The general acceleration sensor can detect acceleration of a sum of dynamic acceleration components (motion acceleration components) and static acceleration components (gravitational acceleration components), and cannot compute static acceleration components from the acceleration of the sum. Even though it is conceivable to compute the static acceleration components from the acceleration of the sum using a low-pass filter, etc., the accuracy in computing the static acceleration components is insufficient.

Therefore, in the general acceleration sensor 10, for example, when the drone 50 moves in response to an instruction from the remote controller 60 or loses the attitude under an influence of wind, a direction of the acceleration of the sum of the dynamic acceleration components (motion acceleration components) and the static acceleration components (gravitational acceleration components) may be misrecognized as the gravity direction in some cases.

On the other hand, in the present embodiment, as described above, the static acceleration components (gravitational acceleration components) can be accurately calculated. Therefore, even when the drone 50 moves in response to an instruction from the remote controller 60 or loses the attitude under an influence of wind, it is possible to accurately determine the gravity direction in the local coordinate system on the basis of the computed static acceleration components. Therefore, even in such a case, the control unit 52 can accurately determine the attitude of the drone 50 in the global coordinate system, and can accurately control the attitude of the drone 50.

In particular, in the present embodiment, it is possible to appropriately cope with a case in which the drone 50 intensely moves or unexpectedly loses the attitude due to strong wind. Further, in the present embodiment, even when the drone 50 may not receive a signal from the GPS satellite due to a building, etc., the attitude of the drone 50 can be accurately controlled.

In addition, in the present embodiment, the static acceleration components are corrected on the basis of correction information for correcting the static acceleration components by using the dynamic acceleration components and the angular velocity components. Further, since the gravity direction is determined by the corrected static acceleration components (Gr-x', Gr-y', and Gr-z'), the accuracy of determination of the gravity direction can be further improved, and the attitude of the drone 50 can be more accurately controlled.

Here, in a case in which the drone 50 is a flight mode switching type drone 50 (a type of switching between a mode in which the double inversion type propeller 51 rotates with a rotation axis of the propeller 51 oriented in the Z'-axis direction and a mode in which the propeller 51 rotates with the rotation axis oriented in the Y'-axis direction) is presumed. In this case, the drone 50 may lose balance when the two modes are switched. In such a case, by accurately determining the gravity direction of the drone 50 using the present technology and accurately controlling the attitude of the drone 50, it is possible to accurately restore the attitude even when the attitude of the drone 50 is lost.

Second Embodiment

Next, a second embodiment of the present technology will be described. In description of the second embodiment and the subsequent embodiments, the same reference numeral will be assigned to a portion having a similar configuration and function to those of the first embodiment described above, and a description will be omitted or simplified.

Figure 17:
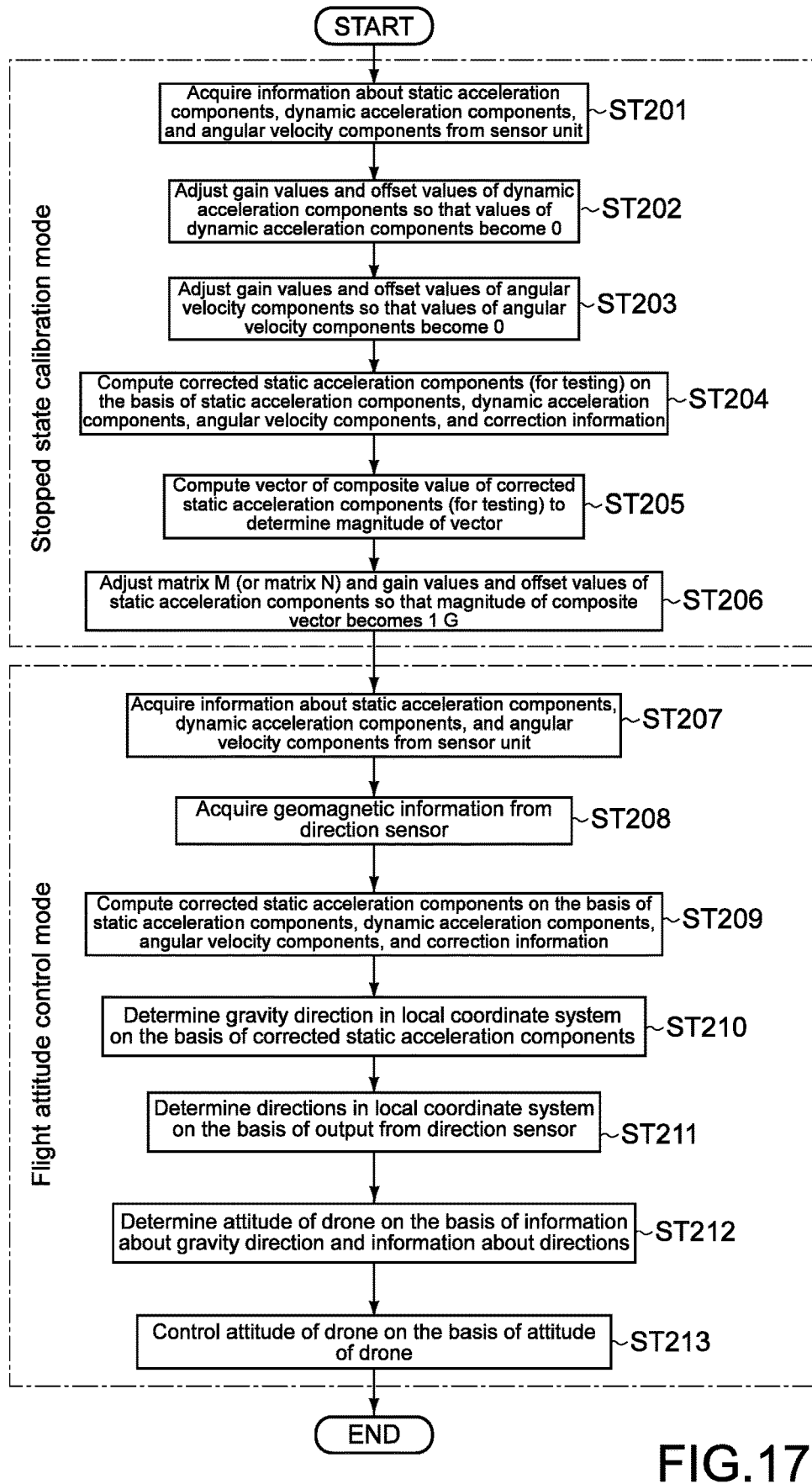
FIG. 17 is a flowchart illustrating processing of a control unit of a drone according to a second embodiment.

FIG. 17 is a flowchart illustrating processing of the control unit 52 of the drone 50 according to the second embodiment.

When the system is activated by turning ON the power, etc., the control unit 52 first executes a stopped state calibration mode (see steps 201 to 206). In the stopped state calibration mode, the user places the drone 50 at a certain position in the basic attitude, and keeps the drone 50 stationary.

In the stopped state calibration mode, first, the control unit 52 acquires information about the static acceleration components, the dynamic acceleration components and the angular velocity components output from the sensor unit 40 in the stopped state at a predetermined clock cycle (steps 201).

Subsequently, the control unit 52 adjusts (generates) gain values and offset values of the dynamic acceleration components so that values of the dynamic acceleration components (Acc-x, Acc-y, and Acc-z) become 0 (step 202).

Subsequently, the control unit 52 adjusts (generates) gain values and offset values of the angular velocity components so that values of the angular velocity components ($\omega_x$, $\omega_y$, and $\omega_z$) become 0 (step 203).

Subsequently, for testing, the control unit 52 computes the corrected static acceleration components (Gr-x', Gr-y', and Gr-z') for testing on the basis of the nine elements of the static acceleration components (Gr-x, Gr-y, and Gr-z), the dynamic acceleration components (Acc-x, Acc-y, and Acc-z), and the angular velocity components ($\omega_x$, $\omega_y$, and $\omega_z$) and correction information for correcting the static acceleration components (step 204).

In step 204, for example, the control unit 52 executes calculation of the matrix $Y^T = MX^T$ to obtain the transposed matrix $Y^T$ of the corrected static acceleration components (for testing). Alternatively, the control unit 52 executes calculation of the matrix $Y^T = NX^T + Z^T$ to obtain the transposed matrix $Y^T$ of the corrected static acceleration components (for testing). Then, the control unit 52 obtains the corrected static acceleration components (for testing) from the obtained transposed matrix $Y^T$.

Here, the nine elements (Gr-x, Gr-y, Gr-z, Acc-x, Acc-y, Acc-z, $\omega_x$, $\omega_y$, and $\omega_z$) used when the corrected static acceleration components (for testing) are obtained may correspond to a set of nine elements at a current time or a plurality of sets of nine elements from a predetermined time before the current time to the current time.

When the corrected static acceleration components (for testing) are computed, the control unit 52 subsequently computes the vector of the composite value ($\sqrt{((Gr-x')^2 + (Gr-y')^2 + (Gr-z')^2)}$) of the corrected static acceleration components (for testing) in the local coordinate system to determine a magnitude of the vector (step 205).

Subsequently, the control unit 52 adjusts (generates) the matrix M (or the matrix N) and the gain values and the offset values of the static acceleration components so that the magnitude of the vector of the composite value becomes 1 G (step 206). In the present embodiment, the matrix M (or the matrix N) and the gain values and the offset values of the static acceleration components correspond to correction information for correcting the static acceleration components.

When the stopped state calibration mode ends, the control unit 52 subsequently executes a flight attitude control mode (see steps 207 to 213) for controlling the attitude of the drone 50 while the drone 50 is flying.

In the flight attitude control mode, first, the control unit 52 acquires the information about the static acceleration components (Gr-x, Gr-y, and Gr-z), the dynamic acceleration components (Acc-x, Acc-y, and Acc-z,) and the angular velocity components ($\omega_x$, $\omega_y$, and $\omega_z$) output from the sensor unit 40 at a predetermined clock cycle (step 207). Further, the control unit 52 acquires geomagnetic information output from the direction sensor 53 at a predetermined clock cycle (step 208).

Subsequently, the control unit 52 computes the corrected static acceleration components (Gr-x', Gr-y', and Gr-z') on the basis of the nine elements of the static acceleration components (Gr-x, Gr-y, and Gr-z), the dynamic acceleration components (Acc-x, Acc-y, and Acc-z,) and the angular velocity components ($\omega_x$, $\omega_y$, and $\omega_z$) and the correction information for correcting the static acceleration components (step 209).

In step 209, as six elements of the dynamic acceleration components (Acc-x, Acc-y, and Acc-z,) and the angular velocity components ($\omega_x$, $\omega_y$, and $\omega_z$) among the nine elements, values corrected by the gain values and the offset values adjusted in the stopped state calibration mode (see steps 202 and 203) are used.

In step 209, for example, the control unit 52 executes calculation of the matrix $Y^T = MX^T$ using the matrix M (correction information) having nine rows and three columns, and the transposed matrix $X^T$ of the vector of the nine elements (Gr-x, Gr-y, Gr-z, Acc-x, Acc-y, Acc-z, $\omega_x$, $\omega_y$, and $\omega_z$) to obtain the transposed matrix $Y^T$ of the corrected static acceleration components (Gr-x', Gr-y', and Gr-z').

Alternatively, the control unit 52 executes calculation of the matrix $Y^T = NX^T + Z^T$ using the matrix N (correction information), the transposed matrix $X^T$, and the transposed matrix $Z^T$ of the static acceleration components (Gr-x, Gr-y, and Gr-z) (before correction) to obtain the transposed matrix $Y^T$ of the corrected static acceleration components (Gr-x', Gr-y', and Gr-z').

When the transposed matrix $Y^T$ is obtained, the corrected static acceleration components (Gr-x', Gr-y', and Gr-z') are obtained on the basis of the transposed matrix $Y^T$.

In step 209, the matrix M (or the matrix N), the gain values, and the offset values (see step 206) adjusted in the stopped state calibration mode are used to correct the static acceleration components.

It should be noted that the nine elements (Gr-x, Gr-y, Gr-z, Acc-x, Acc-y, Acc-z, $\omega_x$, $\omega_y$, and $\omega_z$) used when the corrected static acceleration components (Gr-x', Gr-y', and Gr-z') are obtained may correspond to a set of nine elements at a current time or a plurality of sets of nine elements from a predetermined time before the current time to the current time.

When the corrected static acceleration components are computed, the control unit 52 subsequently determines the gravity direction in the local coordinate system on the basis of the corrected static acceleration components (Gr-x', Gr-y', and Gr-z') (step 210). In this case, typically, the control unit 52 determines that the direction in which the vector of the composite value ($\sqrt{((Gr-x')^2 + (Gr-y')^2 + (Gr-z')^2)}$) of the corrected static acceleration components is directed corresponds to the gravity direction in the local coordinate system.

When the gravity direction in the local coordinate system is determined, the control unit 52 subsequently determines directions (north, south, east, and west) in the local coordinate system on the basis of an output from the direction sensor 53 (step 211).

Subsequently, the control unit 52 determines the attitude of the drone 50 in the global coordinate system on the basis of the information about the gravity direction in the local coordinate system and the information about the directions in the local coordinate system (step 212). Subsequently, the control unit 52 controls the attitude of the drone 50 on the basis of the attitude of the drone 50 (step 213).

In the second embodiment, the matrix M (or the matrix N) and the gain values and the offset values of the static acceleration components are adjusted so that the magnitude of the vector of the composite value of the corrected static acceleration components (for testing) becomes 1 G in the stopped state calibration mode. Further, in the flight attitude control mode, since the matrix M (or the matrix N) and the gain values and the offset values of the static acceleration components (that is, the correction information) adjusted in the stopped state calibration mode are used to compute the corrected static acceleration components, it is possible to more accurately determine the gravity direction.

Third Embodiment

Next, a third embodiment of the present technology will be described. In the second embodiment described above, a description has been given of a case in which stopped state calibration is performed while the drone 50 is at rest. On the other hand, the third embodiment is different from the above-described second embodiment in that flight state calibration is performed while the drone 50 is flying (is in air).

Figure 18:
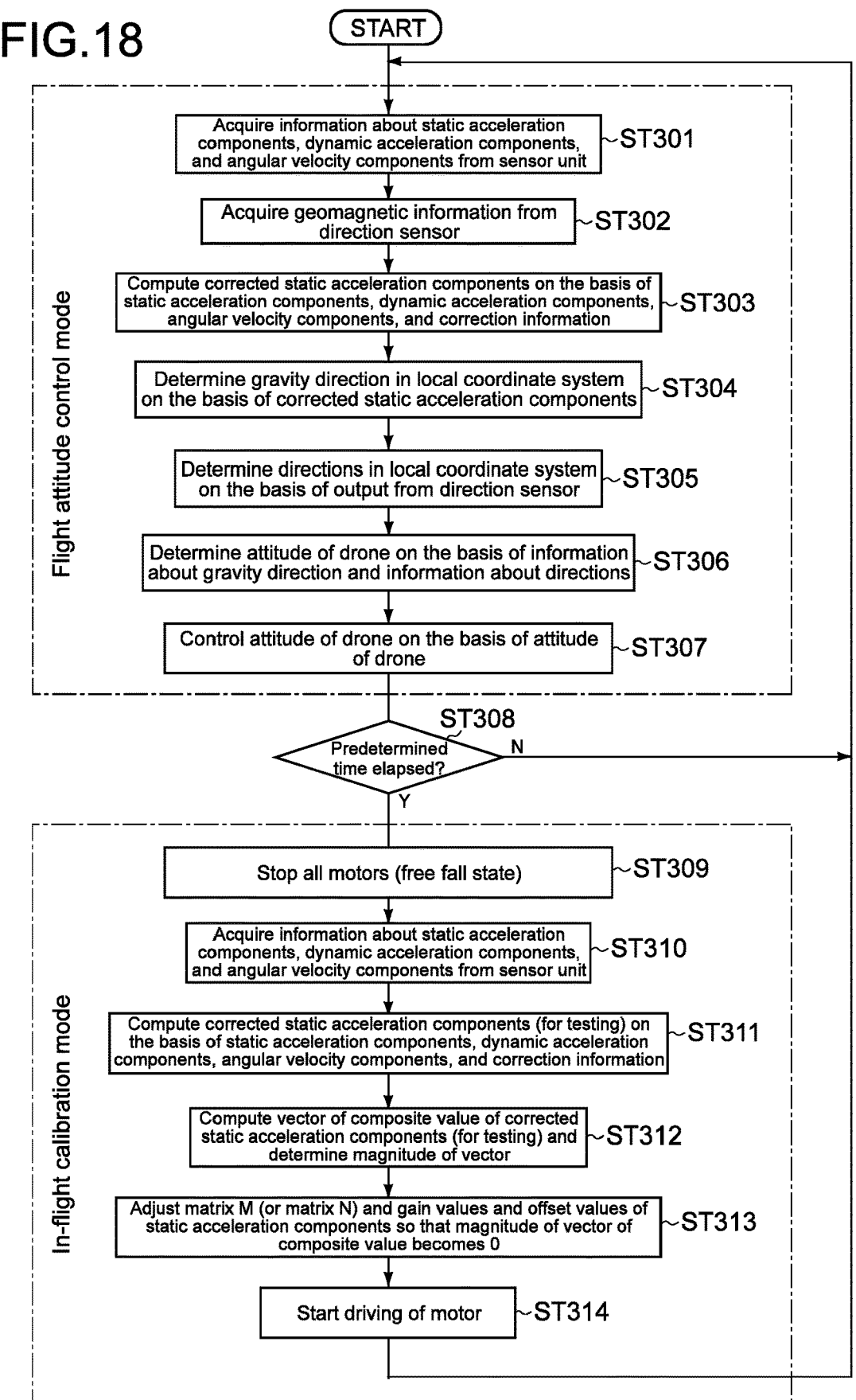
FIG. 18 is a flowchart illustrating processing of a control unit of a drone according to a third embodiment.

FIG. 18 is a flowchart illustrating processing of the control unit 52 of the drone 50 according to the third embodiment.

When the system is activated by turning ON the power, etc. and flight of the drone 50 is started, the control unit 52 executes the flight attitude control mode (see step 301 to step 307).

Processing in the flight attitude control mode in the third embodiment (step 301 to step 307) is the same as step 101 to step 107 in the first embodiment, and thus a description thereof will be omitted.

It should be noted that in the third embodiment, the stopped state calibration mode may be executed before the flight attitude control mode similarly to the second embodiment. In this case, processing of step 301 to step 307 in the third embodiment is the same as processing of step 207 to step 213 in the second embodiment.

Upon execution of the flight attitude control mode, the control unit 52 determines whether a predetermined time (for example, about 10 minutes) has elapsed since the in-flight calibration mode was executed last time (step 308).

When the predetermined time has not elapsed (NO in step 308), the control unit 52 returns to step 301 to execute the flight attitude control mode again. On the other hand, when the predetermined time has elapsed (YES in step 308), the control unit 52 executes the in-flight calibration mode (see step 309 to step 314).

In the in-flight calibration mode, first, the control unit 52 stops all the motors 58 in the drone 50 and brings the drone 50 into a free fall state (step 309).

Subsequently, the control unit 52 acquires the information about the static acceleration components, the dynamic acceleration components, and the angular velocity components output from the sensor unit 40 at a predetermined clock cycle (step 310).

Subsequently, for testing, the control unit 52 computes the corrected static acceleration components (Gr-x', Gr-y', and Gr-z') for testing on the basis of the nine elements of the static acceleration components (Gr-x, Gr-y, and Gr-z), the dynamic acceleration components (Acc-x, Acc-y, and Acc-z), and the angular velocity components ($\omega_x$, $\omega_y$, and $\omega_z$) and the correction information for correcting the static acceleration components (step 311).

In step 310, for example, the control unit 52 executes calculation of the matrix $Y^T = MX^T$ to obtain the transposed matrix $Y^T$ of the corrected static acceleration components (for testing). Alternatively, the control unit 52 executes calculation of the matrix $Y^T = NX^T + Z^T$ to obtain the transposed matrix $Y^T$ of the corrected static acceleration components (for testing). Then, the control unit 52 obtains the corrected static acceleration components (for testing) from the obtained transposed matrix $Y^T$.

Here, the nine elements (Gr-x, Gr-y, Gr-z, Acc-x, Acc-y, Acc-z, $\omega_x$, $\omega_y$, and $\omega_z$) used when the corrected static acceleration components (for testing) are obtained may correspond to a set of nine elements at a current time or a plurality of sets of nine elements from a predetermined time before the current time (after the free fall state) to the current time.

When the corrected static acceleration components (for testing) are computed, the control unit 52 subsequently computes the vector of the composite value ($\sqrt{((Gr-x')^2+(Gr-y')^2+(Gr-z')^2)}$) of the corrected static acceleration components (for testing) in the local coordinate system to determine a magnitude of the vector (step 312).

Subsequently, the control unit 52 adjusts (generates) the matrix M (or the matrix N) and the gain values and the offset values of the static acceleration components so that the magnitude of the vector of the composite value becomes 0 (step 313). That is, when the drone 50 is in the free fall state, the acceleration sensor 10 is in a weightless state, and the magnitude of the vector of the composite value becomes 0. Thus, calibration is performed in accordance therewith. In the present embodiment, the matrix M (or the matrix N) and the gain values and the offset values of the static acceleration components correspond to correction information for correcting the static acceleration components.

Subsequently, the control unit 52 starts driving of the motor 58 (step 314), and executes the flight attitude control mode again. In the flight attitude control mode, when the corrected static acceleration components are computed (see step 303), the correction information adjusted in the in-flight calibration mode is used.

As described above, in the third embodiment, in the in-flight calibration mode, the matrix M (or the matrix N) and the gain values and the offset values of the static acceleration components are adjusted so that the magnitude of the vector of the composite value of the corrected static acceleration components (for testing) becomes 0 G. Then, in the flight attitude control mode, the matrix M (or the matrix N) and the gain values and the offset values of the static acceleration components (that is, the correction information) adjusted in the in-flight calibration mode are used for computing the corrected static acceleration components. Thus, it is possible to more accurately determine the gravity direction.

In particular, in the third embodiment, when the drone 50 is flying, calibration can be automatically performed by the drone 50.

In description of the third embodiment, a description has been given of a case in which the drone 50 is in the free fall state and the acceleration sensor 10 is in the weightless state when driving of the motor 58 is stopped. On the other hand, when the shape of the airframe corresponds to the airplane (fixed wing), etc., even if driving of the motor 58 is stopped, a lift of the wing is generated, and thus the drone 50 is not in the free fall state, and the acceleration sensor 10 may detect certain acceleration in some cases.

Therefore, in such a case, in step 313, the control unit 52 adjusts the matrix M (or the matrix N) and the gain values and the offset values of the static acceleration components so that the magnitude of the vector of the composite value becomes a predetermined value (not 0). As the predetermined value corresponding to a source of calibration, an appropriate value measured by repeating a test of stopping driving of the motor 58 and flying the airplane-type drone 50 is used.

It should be noted that when the airframe of the drone 50 is of the airplane type, even if the motor 58 is stopped in the air for calibration, a flight state can be stably maintained to some extent.

<<Various Modifications>>

Here, for example, when the drone 50 is used to transport an article, the control unit 52 may obtain an attitude of the article on the basis of the attitude of the drone 50. In the present technology, since the attitude of the drone 50 can be accurately determined, the attitude of the article can be accurately determined. In this case, the control unit 52 may store the attitude of the article in the storage unit in association with time, and transmit this information to another device such as the remote controller 60. The user can know a change in the correct attitude of the article by another device such as the remote controller 60.

In the above description, the drone 50 has been described as an example of the flying object. Meanwhile, the flying object is not limited to the drone 50, and may correspond to a manned airplane, a helicopter, etc.

The processing of the control unit 52 in the drone 50 (or the processing of the controller 20 of the sensor unit 40) described above may be executed by the remote controller 60 (in this case, the remote controller 60 corresponds to the attitude control device). Alternatively, this processing may be executed by the server device on the network (in this case, the server device corresponds to the attitude control device).

The present technology may have the following configurations.

(1) An attitude control device including
a control unit that determines a gravity direction in a flying object on the basis of static acceleration components computed on the basis of a first acceleration detection signal obtained by detecting dynamic acceleration components acting on the flying object and a second acceleration detection signal obtained by detecting the dynamic acceleration components and the static acceleration components acting on the flying object, and controls an attitude of the flying object on the basis of the gravity direction.

(2) The attitude control device according to item (1), in which
the control unit corrects the static acceleration components on the basis of correction information for correcting the static acceleration components, and determines the gravity direction on the basis of the corrected static acceleration components.

(3) The attitude control device according to item (2), in which
the control unit corrects the static acceleration components on the basis of the correction information for correcting the static acceleration components by using the dynamic acceleration components.

(4) The attitude control device according to item (2) or (3), in which
the control unit corrects the static acceleration components on the basis of the correction information for correcting the static acceleration components by using angular velocity components acting on the flying object.

(5) The attitude control device according to any one of items (2) to (4), in which
the control unit generates the correction information in a state in which the flying object is placed at a certain position.

(6) The attitude control device according to any one of items (2) to (5), in which
the control unit generates the correction information in a state in which the flying object is in air.

(7) The attitude control device according to any one of items (1) to (6), further including
an acceleration calculation unit that computes the static acceleration components on the basis of the first acceleration detection signal having an AC waveform according to the dynamic acceleration components and the second acceleration detection signal having an output waveform in which an AC component according to the dynamic acceleration components is superimposed on a DC component according to the static acceleration components.

(8) The attitude control device according to item (7), in which
the acceleration calculation unit includes a calculation circuit that computes the static acceleration components on the basis of a difference signal between the first acceleration detection signal and the second acceleration detection signal.

(9) The attitude control device according to item (8), in which
the acceleration calculation unit further includes a gain adjustment circuit that adjusts gain of each signal so that the first acceleration detection signal and the second acceleration detection signal have a same level.

(10) The attitude control device according to item (9), in which
the acceleration calculation unit further includes a correction circuit that computes a correction coefficient on the basis of the difference signal and corrects either one of the first acceleration detection signal and the second acceleration detection signal using the correction coefficient.

(11) The attitude control device according to any one of items (1) to (10), further including
a detector including a movable portion movable in response to acceleration acting on the flying object, a piezoelectric first acceleration detector provided on the movable portion to output the first acceleration detection signal, and a non-piezoelectric second acceleration detector provided on the movable portion to output the second acceleration detection signal.

(12) The attitude control device according to item (11), in which
the second acceleration detector includes a piezoresistive acceleration detection element.

(13) The attitude control device according to item (11), in which
the second acceleration detector includes an electrostatic capacitive acceleration detection element.

(14) A flying object including
a detector that outputs a first acceleration detection signal obtained by detecting dynamic acceleration components acting on the flying object and a second acceleration detection signal obtained by detecting the dynamic acceleration components and static acceleration components acting on the flying object, and
a control unit that determines a gravity direction in the flying object on the basis of the static acceleration components computed on the basis of the first acceleration detection signal and the second acceleration detection signal, and controls an attitude of the flying object on the basis of the gravity direction.

(15) An attitude control method including
determining a gravity direction in a flying object on the basis of static acceleration components computed on the basis of a first acceleration detection signal obtained by detecting dynamic acceleration components acting on the flying object and a second acceleration detection signal obtained by detecting the dynamic acceleration components and the static acceleration components acting on the flying object, and controlling an attitude of the flying object on the basis of the gravity direction.

(16) A program that causes a computer to execute
a step of determining a gravity direction in a flying object on the basis of static acceleration components computed on the basis of a first acceleration detection signal obtained by detecting dynamic acceleration components acting on the flying object and a second acceleration detection signal obtained by detecting the dynamic acceleration components and the static acceleration components acting on the flying object, and
a step of controlling an attitude of the flying object on the basis of the gravity direction.

REFERENCE SIGNS LIST 10 acceleration sensor
11 first acceleration detector
12 second acceleration detector
20 controller
30 angular velocity sensor
31 angular velocity detector
40 sensor unit
50 drone
52 control unit
60 remote controller

The invention claimed is:

1. An attitude control device comprising
a control unit that determines a gravity direction in a flying object on a basis of static acceleration components computed on a basis of a first acceleration detection signal obtained by detecting dynamic acceleration components acting on the flying object and a second acceleration detection signal obtained by detecting the dynamic acceleration components and the static acceleration components acting on the flying object, and controls an attitude of the flying object on a basis of the gravity direction.

2. The attitude control device according to claim 1, wherein
the control unit corrects the static acceleration components on a basis of correction information for correcting the static acceleration components, and determines the gravity direction on a basis of the corrected static acceleration components.

3. The attitude control device according to claim 2, wherein
the control unit corrects the static acceleration components on a basis of the correction information for correcting the static acceleration components by using the dynamic acceleration components.

4. The attitude control device according to claim 2, wherein
the control unit corrects the static acceleration components on a basis of the correction information for correcting the static acceleration components by using angular velocity components acting on the flying object.

5. The attitude control device according to claim 2, wherein
the control unit generates the correction information in a state in which the flying object is placed at a certain position.

6. The attitude control device according to claim 2, wherein
the control unit generates the correction information in a state in which the flying object is in air.

7. The attitude control device according to claim 1, further comprising
an acceleration calculation unit that computes the static acceleration components on a basis of the first acceleration detection signal having an alternating current (AC) waveform according to the dynamic acceleration components and the second acceleration detection signal having an output waveform in which an AC component according to the dynamic acceleration components is superimposed on a direct current (DC) component according to the static acceleration components.

8. The attitude control device according to claim 7, wherein
the acceleration calculation unit includes a calculation circuit that computes the static acceleration components on a basis of a difference signal between the first acceleration detection signal and the second acceleration detection signal.

9. The attitude control device according to claim 8, wherein
the acceleration calculation unit further includes a gain adjustment circuit that adjusts gain of each signal so that the first acceleration detection signal and the second acceleration detection signal have a same level.

10. The attitude control device according to claim 9, wherein
the acceleration calculation unit further includes a correction circuit that computes a correction coefficient on a basis of the difference signal and corrects either one of the first acceleration detection signal and the second acceleration detection signal using the correction coefficient.

11. The attitude control device according to claim 1, further comprising
a detector including a movable portion movable in response to acceleration acting on the flying object, a piezoelectric first acceleration detector provided on the movable portion to output the first acceleration detection signal, and a non-piezoelectric second acceleration detector provided on the movable portion to output the second acceleration detection signal.

12. The attitude control device according to claim 11, wherein
the second acceleration detector includes a piezoresistive acceleration detection element.

13. The attitude control device according to claim 11, wherein
the second acceleration detector includes an electrostatic capacitive acceleration detection element.

14. A flying object comprising:
a detector that outputs a first acceleration detection signal obtained by detecting dynamic acceleration components acting on the flying object and a second acceleration detection signal obtained by detecting the dynamic acceleration components and static acceleration components acting on the flying object; and
a control unit that determines a gravity direction in the flying object on a basis of the static acceleration components computed on a basis of the first acceleration detection signal and the second acceleration detection signal, and controls an attitude of the flying object on a basis of the gravity direction.

15. An attitude control method comprising:
determining a gravity direction in a flying object on a basis of static acceleration components computed on a basis of a first acceleration detection signal obtained by detecting dynamic acceleration components acting on the flying object and a second acceleration detection signal obtained by detecting the dynamic acceleration components and the static acceleration components acting on the flying object; and
controlling an attitude of the flying object on a basis of the gravity direction.

16. A program that causes a computer to execute:
a step of determining a gravity direction in a flying object on a basis of static acceleration components computed on a basis of a first acceleration detection signal obtained by detecting dynamic acceleration components acting on the flying object and a second acceleration detection signal obtained by detecting the dynamic acceleration components and the static acceleration components acting on the flying object; and a step of controlling an attitude of the flying object on a basis of the gravity direction.

* * * * *